US 6,600,548 B2

United States Patent
Enomoto

(10) Patent No.: US 6,600,548 B2
(45) Date of Patent: Jul. 29, 2003

(54) IMAGE PROCESSING METHOD AND APPARATUS

(75) Inventor: Jun Enomoto, Kanagawa (JP)

(73) Assignee: Fuji Photo Film Co, Ltd., Kanagawa (JP)

( * ) Notice: Subject to any disclaimer, the term of this patent is extended or adjusted under 35 U.S.C. 154(b) by 0 days.

(21) Appl. No.: 09/953,957

(22) Filed: Sep. 18, 2001

(65) Prior Publication Data
US 2002/0030797 A1 Mar. 14, 2002

Related U.S. Application Data

(62) Division of application No. 09/466,140, filed on Dec. 21, 1999, now Pat. No. 6,313,902.

(30) Foreign Application Priority Data

Dec. 21, 1998 (JP) ............................................ 10-362229
Mar. 9, 1999 (JP) ............................................ 11-061597

(51) Int. Cl.[7] .......................... G03B 17/24; G03B 27/52
(52) U.S. Cl. ........................ 355/40; 396/311; 358/506; 348/96
(58) Field of Search .............................. 355/39, 40, 41, 355/42, 43; 396/311, 429; 358/487, 506; 348/96, 97, 110, 112

(56) References Cited

U.S. PATENT DOCUMENTS

| 5,461,440 A | * | 10/1995 | Toyoda et al. ............... 358/302 |
| 5,486,895 A | * | 1/1996 | Leidig et al. ................. 355/43 |
| 5,680,171 A | | 10/1997 | Lo et al. |
| 5,917,578 A | * | 6/1999 | Nakamura .................... 355/40 |
| 6,091,445 A | | 7/2000 | Matsui et al. |

FOREIGN PATENT DOCUMENTS

| JP | 7287360 | 10/1995 |
| JP | 9281613 | 10/1997 |

* cited by examiner

Primary Examiner—David Gray
(74) Attorney, Agent, or Firm—Birch, Stewart, Kolasch & Birch, LLP.

(57) ABSTRACT

An apparatus and method for performing correction of at least one of correction of chromatic aberration of magnification, distortion aberration, deterioration of marginal luminosity and defocusing on the image data is disclosed. The method and apparatus designates a lens type taking lens manually and then performs correction of the image quality deterioration using the designated lens type and a position information of the image.

4 Claims, 9 Drawing Sheets

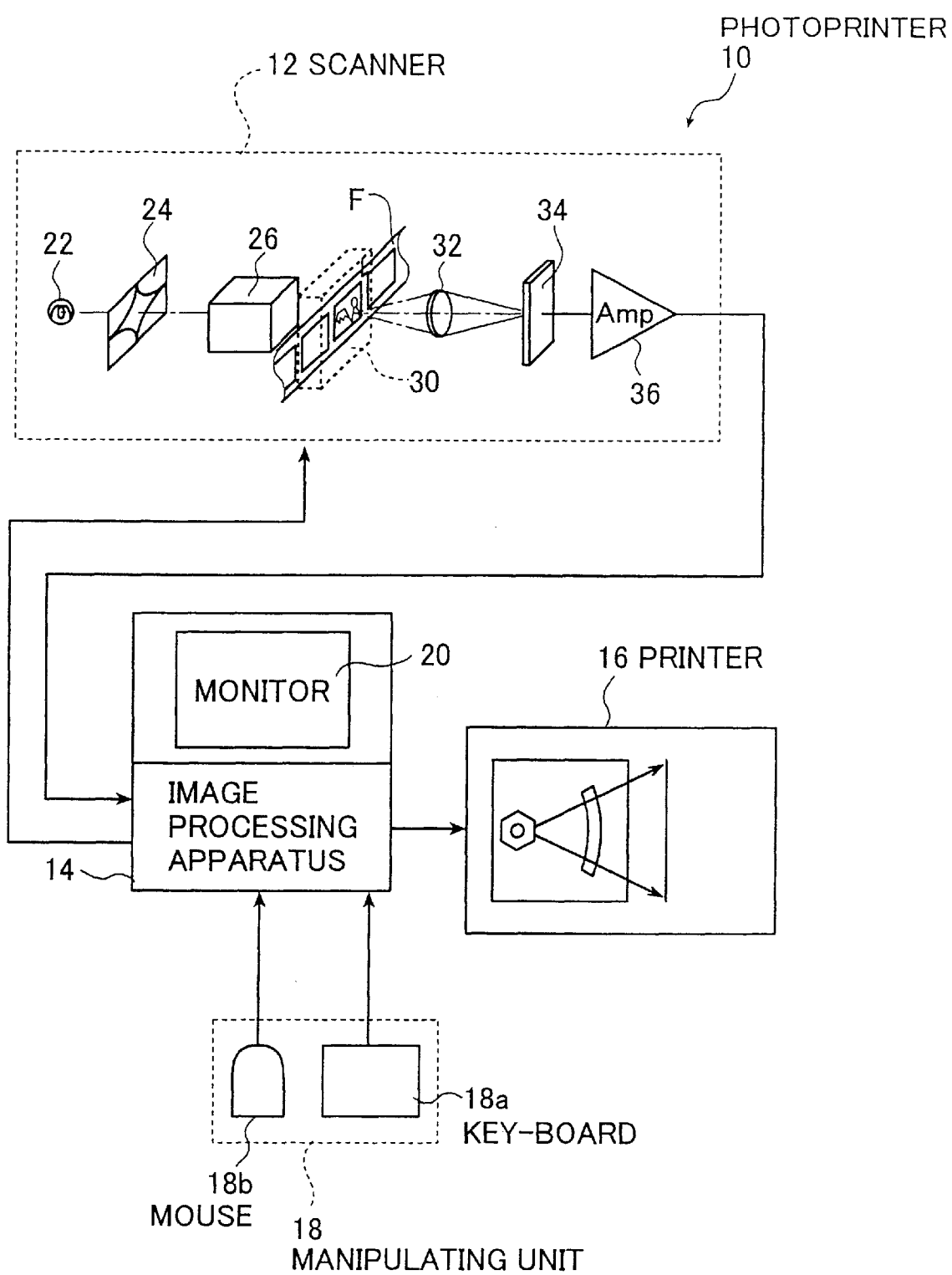

FIG. 8

LENS CORRECTION

LENS TYPE:
- Type 1
- Type 2
- Type 3

CORRECTION ITEMS:
- ALL
- CORRECTION OF CHROMATIC ABERRATION OF MAGNIFICATION
- CORRECTION OF DISTORTION ABERRATION
- CORRECTION OF DETERIORATION OF MARGINAL LUMINATION
- CORRECTION OF DEFOCUSING

[ OK ]   [ CANCEL ]

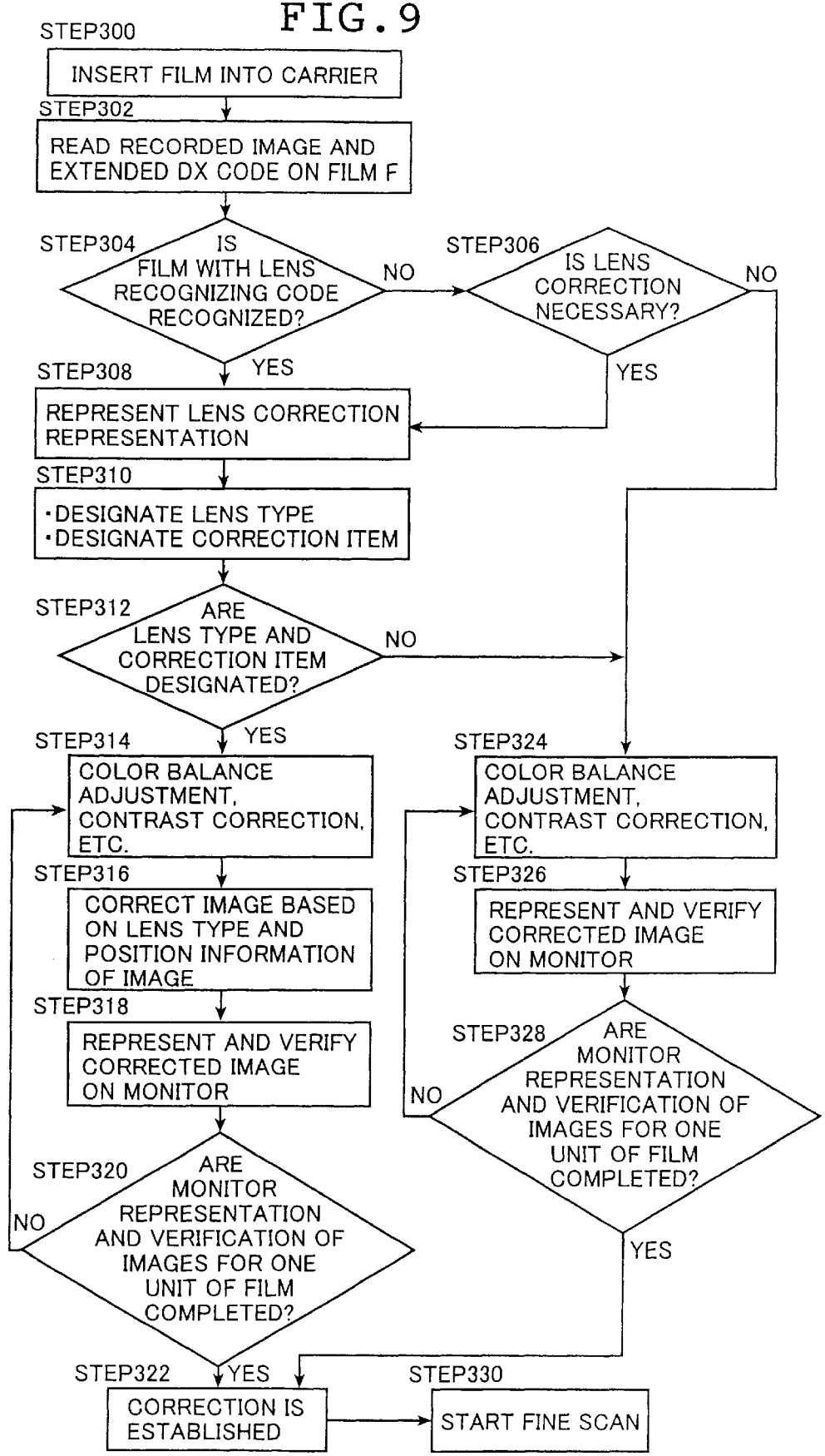

IMAGE PROCESSING METHOD AND APPARATUS

This application is a divisional of application Ser. No. 09/466,140, filed on Dec. 21, 1999, now U.S. Pat. No. 6,313,902 contents of which are hereby incorporated by reference and for which priority is claimed under 35 U.S.C. §120; and this application claims priority of Application No. 10-362229 and 11-061597 filed in Japan on Dec. 21, 1999 and Mar. 9, 1999, respectively under 35 U.S.C. §119.

BACKGROUND OF THE INVENTION

1. Technical Field of the Invention

The present invention relates to the technical field of an image processing method and an image processing apparatus which perform a correction of image quality deterioration such as chromatic aberration of magnification, distortion aberration, deterioration of marginal luminosity, defocusing or the like derived from a taking lens that occurs in an image recorded with a film with lens, a low-priced compact camera, a digital camera or the like in a digital photoprinter or the like which obtains image data either by photoelectrically reading an image optically recorded with a taking lens of a silver halide type photographic camera or the like or direct from an image recorded with the digital camera or the like and then subjects the thus obtained image data to predetermined processing to obtain a print (photographed) reproducing the recorded image as an output image.

2. Prior Art

Heretofore, the images recorded on photographic films such as negative films and reversal films (which are hereunder referred to simply as "films") have been commonly printed on light-sensitive materials (photographic paper) by means of a real exposure, namely, direct (analog) exposure in which the light-sensitive materials are exposed by projecting the image on the film.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record an image (latent image), which is subsequently developed to produce a print (photograph). The printer operating on its principle has been commercialized as a digital photoprinter.

In the digital photoprinter, images are handled as digital image data so that an image processing condition at the time of printing can be established by image data processing. Therefore, correction of washed-out highlights or dull shadows caused by photographing with backlight, an electronic flash or the like, sharpness processing (sometimes referred to simply as "sharpening") or the like are favorably performed to produce a high quality print which has never been realized by a conventional direct exposure.

However, a case may occur that even if image data processing is performed on the image data of the image taken or recorded on the film, quality of the output image on the print can not adequately be improved. The case, for example, illustrates chromatic aberration of magnification, distortion aberration, deterioration of marginal luminosity, defocusing or the like derived from performance (aberration characteristic) of a lens mounted on the camera used to take the image.

A color image is formed of three primary colors: red (R), green (G) and blue (B). Since refractive index of the lens (imaging magnification) varies subtly with wavelength, the imaging magnifications of R, G and B lights are different from each other to generate the chromatic aberration of magnification. As a result, the image reproduced from the film has a definite color divergence.

In order to obtain a satisfactory and appropriately recorded image, a plane that is perpendicular to an optical axis must be focused on an imaging plane in correspondence with the plane. In fact, however, an ordinary lens has the imaging positions displaced along the optical axis and the resulting displacements of the focused positions in the axial direction cause the distortion, namely, distortion aberration of the focused image. As a natural consequence, the reproduction of the image taken on the film is distorted.

Moreover, in the image focused through the taking lens, by originating in a lens (aberration) characteristic that luminosity is deteriorated from the center area toward marginal areas of the image in accordance with so-called law of cosine to the fourth power ($\cos^4$), luminosity at the marginal areas or edges of the image becomes insufficient or dark, namely, so-called deterioration of marginal luminosity occurs.

Also, owing the aberration characteristic of the taking lens, a focal divergence increases in the marginal areas of the image to generate defocusing (Point Spread Function: PSF) therein.

In such way, owing the aberration characteristic of the taking lens, image quality deterioration such as color divergence, distortion in shape, deterioration of marginal luminosity, defocusing or the like occurs in the output image.

If a camera such as a single-lens reflex camera or the like that needs a cost to some extent is used, high-precision lens elements may be used and a plurality of lens elements combined to correct various aberrations including chromatic aberration of magnification, distortion aberration, deterioration of marginal luminosity, defocusing and the like may be used whereupon an appropriate image can be recorded on the film. However, cameras such as films with lens and compact cameras required to be a low cost can not use high-cost lenses so that the image quality deterioration such as chromatic aberration of magnification, distortion aberration, deterioration of marginal luminosity, defocusing or the like will develop in the images recorded on films. As a result, the image reproduced on the print will eventually be of low quality.

To deal with this problem of image quality deterioration which can not enhance the image quality of output image on the print, techniques have been proposed in connection with an image processing method and apparatus and typical examples of such technologies are disclosed in Unexamined Published Japanese Patent Applications (kokai) No. 287360/1995 and No. 281613/1997. The latter discloses the technique related with an image processing method and apparatus which perform image corrections in accordance with the aberration characteristic of a lens obtained via a lens information acquisition device. It points out that the technique can correct the aberration derived from the lens, prevent the image quality deterioration at marginal areas of the image and obtain a high-quality image in a constant manner.

The former example, i.e., Unexamined Published Japanese Patent Application (kokai) No. 287360/1995, points out that processing information of a film with lens, for example, a lens type recognizing code (code number for recognizing the type of the taking lens) of the taking lens of the film with lens is recorded on the film or the like of the film with lens; then the thus recorded lens type recognizing code is automatically read by utilizing a reading device or the like; hence the deformation caused by the distortion which has been derived from the aberration characteristic of the taking lens can be corrected.

However, a case may occur that the lens type recognizing code of the taking lens can not be obtained because the lens information acquisition device made a reading error of the lens type recognizing code of the taking lens, or because the lens type recognizing code itself of the taking lens has not been recorded. In this case, the aforementioned ordinary technique is not capable of correcting image quality deterioration (hereinafter referred to simply as "image correction") in some cases derived from the taking lens such as distortion aberration, chromatic aberration of magnification, deterioration of marginal luminosity, defocusing or the like so that it can not prevent the image quality deterioration. Moreover, there are some cases in which information related with the lens is obtained; correction intensity to perform the above-mentioned image correction is automatically selected based on the thus obtained information; and the correction of image quality deterioration is performed, when the film is a film with lens which is exposed in a curved form, the correction of aberration can not be appropriately performed only by correcting the aberration characteristic of the taking lens so that distortion aberration or chromatic aberration of magnification still remains uncorrected on the image after subjected to correction; hence, the image quality deterioration can not be prevented.

In a conventional way, the reproduced image after subjected to image correction can not be verified on a monitor so that an operator is not always capable of obtaining a satisfactory print and must print out the reproduced image after subjected to correction to judge whether the image is appropriate or not. Moreover, the operator conventionally establishes correction intensity such as correction direction, correction quantity and the like on each of the images recorded on the film judging from the film to perform the correction of image quality deterioration on an image basis so that the operator must print out the reproduced image after subjected to correction from image to image to judge whether the correction is appropriately performed or not. Hence, there is a problem of aggravation of efficiency due to a significant waste of time and print output.

Further, when the image correction is performed on all of the images recorded on the film, if information on the taking lens can not be obtained so that image correction can not be automatically performed based on the aberration characteristic of the lens, though the lens used in shooting being the same and therefore the lens aberration is the same, a correction condition must be manually set from frame to frame; hence, there is a problem that appropriate and uniform images can not be obtained in a rapid and effective way by the same image correction which does not depend on individual frames.

There is a case in which all images recorded on the film were not always taken with the same camera, namely, a lens having the same aberration characteristic; there is also another case in which images recorded on the same film have different image quality deterioration such as distortion aberration, chromatic aberration of magnification, deterioration of marginal luminosity, defocusing or the like from each other. In these cases, there is a problem that the same image correction can not be performed on all images recorded on one film.

In the case of the film, particularly, of an ordinary 135 size or a film with lens, the above-mentioned correction of image quality deterioration can not be performed by the above-mentioned technique which automatically performs correction by reading the recognizing code of the film with lens involving lens type, for example, the lens type so as to automatically recognize the lens type. Hence, there is a problem that the image quality deterioration can not be prevented.

In such case, for the purpose of correcting the image quality deterioration such as distortion aberration, chromatic aberration of magnification, deterioration of marginal luminosity, defocusing or the like, it may be possible that firstly an image correction method of each image, correction intensity or the like based on its correction image correction method is manually designated, secondly whether the correction is appropriate or not is judged as looking at the corrected image displayed on a monitor and lastly an appropriate correction is established. However, an establishing operation of the appropriate correction of each image as looking at the monitor on an image basis is troublesome for the operator and aggravates work efficiency when a voluminous printout is performed. Moreover, a case may occur that correction of aberration derived from the taking lens is overlooked; hence, there is a problem that a high-quality image can not always be obtained.

SUMMARY OF THE INVENTION

It is, therefore, a first object of the present invention to solve the above problems in the known arts and to provide an image processing method and apparatus that are capable of performing correction of image quality deterioration, namely, correction of distortion aberration, correction of chromatic aberration of magnification, correction of marginal luminosity, correction of defocusing or the like in an appropriate way to prevent the image quality deterioration, even when the image quality deterioration is not appropriately corrected using the obtained lens type recognizing code of a taking lens or even when the lens type recognizing code can not be obtained and moreover that is capable of performing correction of the above-described image quality deterioration in an efficient, appropriate and uniform manner to prevent the image quality deterioration, even when the image correction is performed on a plural of mages recorded on the same film or the like.

A second object of the present invention is to solve the above problems in the known arts and to provide an image processing method and apparatus that are capable of performing a consistent and appropriate correction of aberration, namely, the image deterioration correction of distortion aberration, chromatic aberration of magnification, deterioration of marginal luminosity or defocusing in a uniform and appropriate way without being influenced with an operator's experience, even when reading error of the lens type recognizing code of the taking lens occurs or even when the lens type recognizing code has not been recorded on the film and moreover that are capable of effectively obtaining a satisfactory finishing without forgetting the correction of aberrations derived from the taking lens.

In order to achieve the first object, a first aspect of the present invention is to provide an image processing method comprising the steps of obtaining an input image data from an image recorded optically with a taking lens, displaying a reproduced image of the image based on the thus obtained input image data on a monitor or outputting it as a hardcopy, designating whether correction of image quality deterioration is performed or not based on the reproduced image either displayed on the monitor or reproduced as the hardcopy, performing, when the correction of the image quality deterioration is performed in accordance with the designation of this performance, at least once a sequential process of the image quality deterioration including the steps of designating a correction intensity of the image quality deterioration in accordance with the reproduced image either displayed on the monitor or reproduced as the hardcopy, performing the correction of the image quality deterioration with the correction intensity on the input image date, as well as displaying the corrected reproduced image after the correction of the image quality deterioration is performed on the monitor or outputting it as the hardcopy, thereby establishing appropriately the correction intensity, and performing the correction of the image quality deterioration on the input image data based on the thus established correction intensity to obtain output image data.

Preferably, the image quality deterioration is at least one of chromatic aberration of magnification, distortion aberration, deterioration of marginal luminosity and defocusing derived from the taking lens.

Preferably, a correction step of correction intensities capable of performing designation at the time of designating the correction intensity differs between the chromatic aberration of magnification and distortion aberration.

Preferably, the correction intensity is at least one of correction direction and correction quantity of the image quality deterioration.

Preferably, the sequential process of the image quality deterioration are repeated until a corrected state of the corrected reproduced image either displayed on the monitor or reproduced as the hardcopy comes to be appropriate.

Preferably, the correction of the image quality deterioration is set either based on a correction function, correction coefficients which are used in the correction function and which change in accordance with the correction intensity and a position information of the input image data or based on the correction function which changes in accordance with the correction intensity and the position information of the input image data.

Preferably, when the reproduced image or the corrected reproduced image is displayed on the monitor or outputted as the hardcopy, one of a grid and a straight line as a reference of the correction intensity is provided in the reproduced image or the corrected reproduced image.

Preferably, the correction of the image quality deterioration is performed on the image in a first direction of the recorded image and in a second direction of the recorded image which is perpendicular to the first direction separately or simultaneously.

Preferably, when the taking lens is a lens of a film with lens, the correction of the image quality deterioration is performed on the image in each of a first direction of the recorded image and a second direction of the recorded image which is perpendicular to the first direction separately.

Preferably, the image on which the correction of the image quality deterioration derived from the taking lens has been performed is one image among a plurality of images optically taken with the taking lens and wherein, when each input image data of these plurality of images is obtained and the correction of the image quality deterioration derived from the taking lens is performed on the thus obtained input image data, the correction of the image quality deterioration is performed on each of the input image data of remaining images of the plurality of images using the correction intensity established on the one image on which the correction of the image quality deterioration has been performed to obtain each output image data.

Preferably, the correction of the image quality deterioration is continuously performed on the plurality of images.

Preferably, the plurality of images are contained in a same case or a same piece.

Preferably, the plurality of images are contained in a different case or a different piece.

Preferably, the one image on which the correction intensity has been established is a leading image of the plurality of images and wherein correction of the image quality deterioration is performed on all of the remaining images of the plurality of images using the correction intensity thus established.

Preferably, the correction intensity established on the one image is stored, then read when the correction of the image quality deterioration is performed on the remaining images of the plurality of images and used for performing the correction of the image quality deterioration.

It is preferable that the plurality of images are all of images recorded on a film, wherein the correction intensity to be used for all of images recorded on the film has previously been established on one image among images recorded on the film and wherein the correction of the image quality deterioration is performed on all of images recorded on the film using the established correction intensity.

Preferably, the plurality of images have been recorded on a film with a same camera without the film being rewound and taken out and wherein the plurality of images are subjected to the correction of the image quality deterioration to produce the output image data.

Preferably, the images recorded with the same camera without the film being rewound and taken out are judged by information recorded in a photographed film or on a film cartridge.

Preferably, the information recorded in the photographed film is cartridge mid-roll change information which is additionally recorded in a frame of a film at a time of shooting with a camera having a function capable of changing the film cartridge in a mid-roll state and wherein images of a plurality of frames within a range of images of frames in the film which have been judged as being shot with the same camera without changing the film cartridge in the mid-roll state by the cartridge mid-roll change information are all subjected to the correction of the image quality deterioration with the correction intensity established on the image of a first designated frame.

Preferably, even if the cartridge mid-roll change information has judged that the film cartridges were changed in the mid-roll state, when images of the frames in the film have been shot with the same camera, the images of the frames are subjected to the correction of the image quality deterioration with the correction intensity established on the image of the first designated frame.

Preferably, after all of the corrections of the image quality deterioration to be performed on images recorded on the film are performed and all of the output image data are obtained, the correction intensity is cleared.

Preferably, the image processing method further comprises the steps of storing the input image data of the image optically recorded with the taking lens and the correction intensity in correspondence therebetween or storing the output image data itself after subjected to the correction of the image quality deterioration, keeping them stored for a predetermined period of time, and reading the input image data and the correction intensity or the output image data after subjected to the correction of the image quality deterioration in accordance with a customer's order to produce an output image data for reprint.

A second aspect of the present invention is to provide an image processing apparatus for obtaining image data from an image optically recorded with a taking lens and performing correction of image quality deterioration derived from the taking lens on the thus obtained image data, comprising at least one of a monitor on which a reproduced image based on the image data obtained from the image is displayed and a printer which outputs the reproduced image as a hardcopy image, a correction designating device which performs designation as to whether the correction of the image quality deterioration derived from the taking lens is performed or not based on the reproduced image of the image either displayed on the monitor or outputted as the hardcopy image, a temporary correcting device which, when the correction of the image quality deterioration is performed according to this designation, designates a correction intensity of the image quality deterioration in accordance with the reproduced image either displayed on the monitor or outputted as the hardcopy image, performs the correction of the image quality deterioration as well as displays a corrected reproduced image after subjected to the correction on the monitor or outputs it as the hardcopy image each time the correction of the image quality deterioration is performed, a correction intensity establishing device for establishing the correction intensity from the corrected reproduced image after subjected to the correction of the image quality deterioration which has been either displayed on the monitor or outputted as the hardcopy image by the temporary correcting device, and a correcting device for performing the correction of the image quality deterioration on the image based on the correction intensity thus established to obtain an output image data.

Preferably, the image quality deterioration is at least one of chromatic aberration of magnification, distortion aberration, deterioration of marginal luminosity and defocusing derived from the taking lens.

Preferably, the correction intensity is at least one of correction direction and correction quantity of the image quality deterioration.

Preferably, the image processing apparatus further comprises a continuous correcting device as an additional device which, for the purpose of continuously performing the correction of the image quality deterioration on a plurality of images optically recorded with the taking lens, continuously performs the correction of the image quality deterioration using the correction intensity of one image among the plurality of images established by the correction intensity establishing device to all of the individual image data of the plurality of images to obtain the output image data.

In order to achieve the second object, a third aspect of the present invention is to provide an image processing method for obtaining image data from an image optically recorded with a taking lens to perform image correction of at least one of corrections of chromatic aberration of magnification, distortion aberration, deterioration of marginal luminosity and defocusing on the image data, comprising the steps of designating a lens type of the taking lens manually, and performing the image correction on the image data using the thus designated lens type and a position information of the image.

A fourth aspect of the present invention is to provide an image processing apparatus for obtaining image data from an image optically recorded with a taking lens to perform image correction of at least one of corrections of chromatic aberration of magnification, distortion aberration, deterioration of marginal luminosity and defocusing on the image data, comprising a lens type designating device for designating a lens type of the taking lens manually, and a correcting device for performing the image correction on the image data using the lens type designated by the lens type designating device and a position information of the image.

Preferably, when the image is recorded on the film with lens, the lens type designating device recognizes a recognizing code of the film with lens recorded on the film with lens to demand designation of the lens type automatically.

Preferably, when the image is an image recorded on a film with lens of an Advanced Photo System, the lens type designating device recognizes SSU INDICATOR as the recognizing code of the film with lens.

BRIEF DESCRIPTION OF THE DRAWINGS

FIG. 1 is a block diagram showing an embodiment of a digital photoprinter adapted to an image processing apparatus of the present invention which implements an image processing method of the present invention;

FIG. 8 is a schematic illustration showing another example of a display screen displayed on the monitor according to the image processing apparatus of the present invention; and FIG. 9 is a flowchart showing another example of a schematic flow of the image processing method of the present invention.

DETAILED DESCRIPTION OF THE INVENTION

Figure 2A:
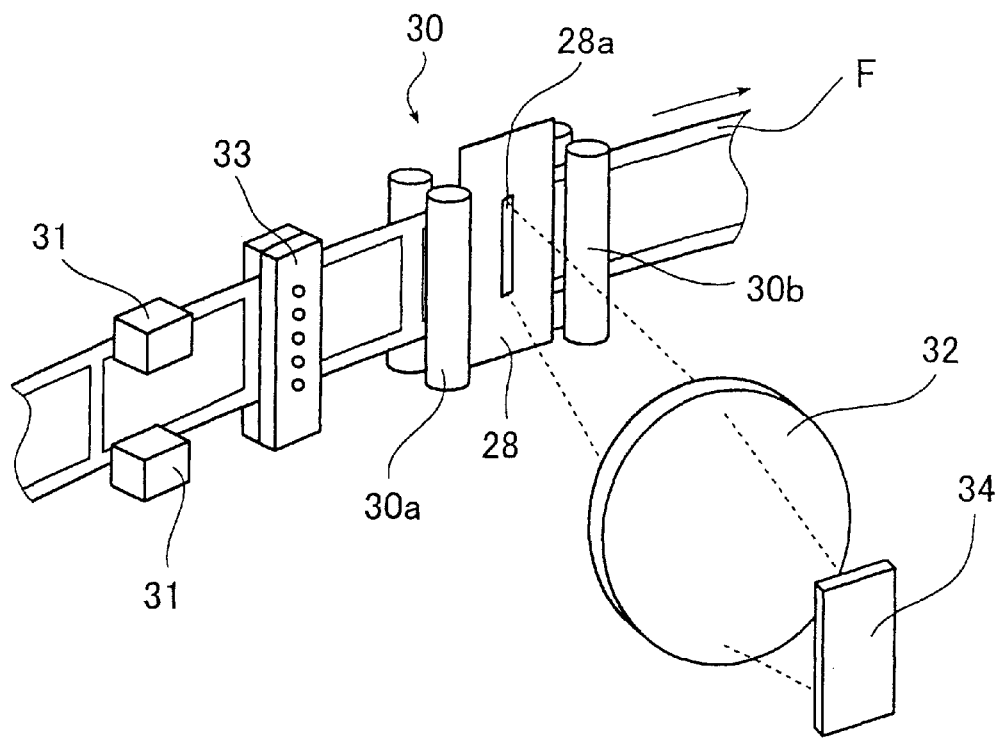
FIG. 2A is a schematic perspective view showing primary parts of an embodiment of a scanner to be used in the digital printer shown in FIG. 1

An image processing method and image processing apparatus according to the present invention will now be described in detail with reference to the preferred embodiments shown in the accompanying drawings.

The image processing method which is a first aspect of the present invention and the image processing apparatus which is a second aspect of the present invention will be described with reference to FIGS. 1 to 6.

FIG. 1 is a block diagram showing an embodiment of a digital photoprinter which uses an image processing method of a first aspect of the present invention and which is provided with an image processing apparatus which is a second aspect of the present invention.

The digital photoprinter (hereinafter referred to simply as "photoprinter") generally indicated by 10 shown in FIG. 1 comprises basically a scanner (image reading apparatus) 12 for photoelectrically reading the image recorded on a film F, an image processing apparatus 14 which performs image processing on the thus read input image data (image information) and with which the photoprinter 10 as a whole is manipulated and controlled, and a printer 16 which performs imagewise exposure of a light-sensitive material with light beams modulated in accordance with the output image data delivered from the image processing apparatus 14 and which performs development and other necessary processing to produce a (finished) print.

The image processing apparatus 14 comprises a monitor 20 which displays a reproduced image based on input image data or a corrected reproduced image after subjected to correction of image quality deterioration for designating or establishing verification of the image recorded on the film F, correction of image quality deterioration such as distortion aberration, chromatic aberration of magnification, deterioration of marginal luminosity, defocusing or the like derived from an aberration characteristic of a taking lens through which the image was taken and its correction intensity of correction quantity, correction direction or the like and which, further, displays various manipulative commands, pictures for setting and registering various conditions or the like.

Connected to the image processing apparatus 14 is a manipulating unit 18 having a key board 18a and a mouse 18b, for example, for performing designation or establishing correction intensity for correcting the above-described image quality deterioration, selection or command of various processing steps, command of color/density correction, input, setting or other operations of various other conditions (image reading condition, image processing condition).

The scanner 12 is an apparatus with which the image recorded on the film F is read photoelectrically. It comprises a light source 22, a variable diaphragm 24, a diffuser box 26 which diffuses the reading light incident on the film F so that it becomes uniform across the plane of the film F, an imaging lens unit 32, a CCD sensor 34 which is a photosensor for reading the image, an amplifier (Amp) 36 and further a dedicated carrier 30 which can be loaded freely in the scanner 12.

As for the carrier 30, various dedicated carriers are prepared in accordance with a web of film such as a film of 135 size for taking 24 frames, a cartridge of the Advanced Photo System (APS) or a film with lens or the like. As shown schematically in FIG. 2A, the carrier 30 comprises transport roller pairs 30a and 30b, a mask 28 having a slit 28a and a magnetic reading device 31. The transport rollers 30a and 30b are provided on opposite sides of a designated reading position in an auxiliary scanning direction and they transport the film F with its length being parallel to the auxiliary scanning direction which is perpendicular to the direction in which the line CCD sensor in the CCD sensor 34 extends (the main scanning direction) as the film F is held in registry with the reading position. The slit 28a extends in the main scanning direction and defines the projected light from the film F to have a designated narrow shape, in a position corresponding to the reading position.

Figure 2B:
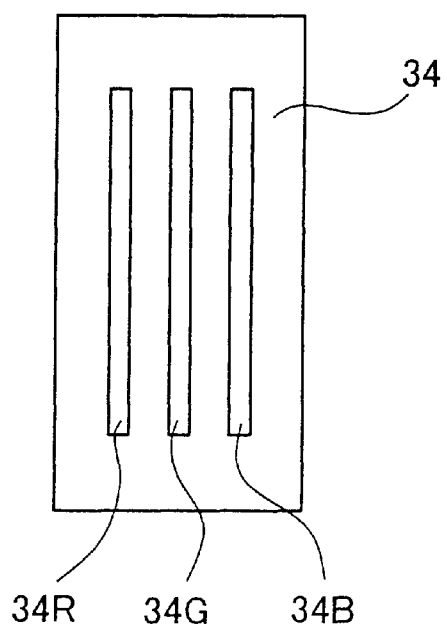
FIG. 2B is a plan view showing an embodiment of a CCD sensor of the scanner shown in FIG. 2A.

The CCD sensor 34, as shown in FIG. 2B, is a line sensor comprising a line CCD sensor 34R for reading an R image, a line CCD sensor 34G for reading a G image and a line CCD sensor 34B for reading a B image. These line CCD sensors each extend toward the main scanning direction in the order of 34R, 34G and 34B. The projected light from the film F is separated into three primary colors R, G and B and captured photoelectrically by means of this CCD sensor.

In the scanner 12, reading of the image by the CCD sensor is performed by prescan which reads the image at low resolution for establishing an image processing condition or the like prior to image reading (fine scan) for outputting a print and next, after the image processing condition is established and the operator adjusts and verifies it, by the fine scan which reads the image at high resolution so that the image reading is performed by two scans: the prescan and fine scan.

At the prescan, a reading light emitted from the light source 22, adjusted in terms of light amount by the variable diaphragm 24 and made uniform through the diffusion box 26 is incident on the film F which is transported as is held in registry with the designated reading position by the carrier 30 and passes therethrough to obtain a projection light carrying the image recorded on the film F.

The projection light passing through the film F is focused on a light-receiving plane of the CCD sensor 34 by the imaging lens unit 32, photoelectrically read by the CCD sensor 34. An output signal from the CCD sensor 34 is amplified by Amp 36 and sent to the image processing apparatus 14 as image data. A series of the above image reading operations are not performed for each of the photographed frames but performed by a single continuous movement of a roll of film at a constant speed.

When the latter is performed, for example, a recognizing code of the film with lens (hereinafter referred to as "film-with-lens recognizing code") indicating that the film F to be read is of a film with lens (in the case of Advanced Photo System (APS), a recognizing code to indicate that the film is the film with lens, namely, "SSU INDICATOR" which is recorded as a latent image in the extended DX code in the region S1 of the film F of the APS shown in FIG. 3 and developed by developing processing of the film F) or a lens type recognizing code may be read by the CCD sensor 34 simultaneously to recognize the film-with-lens recognizing code or the lens type recognizing code.

Figure 3:
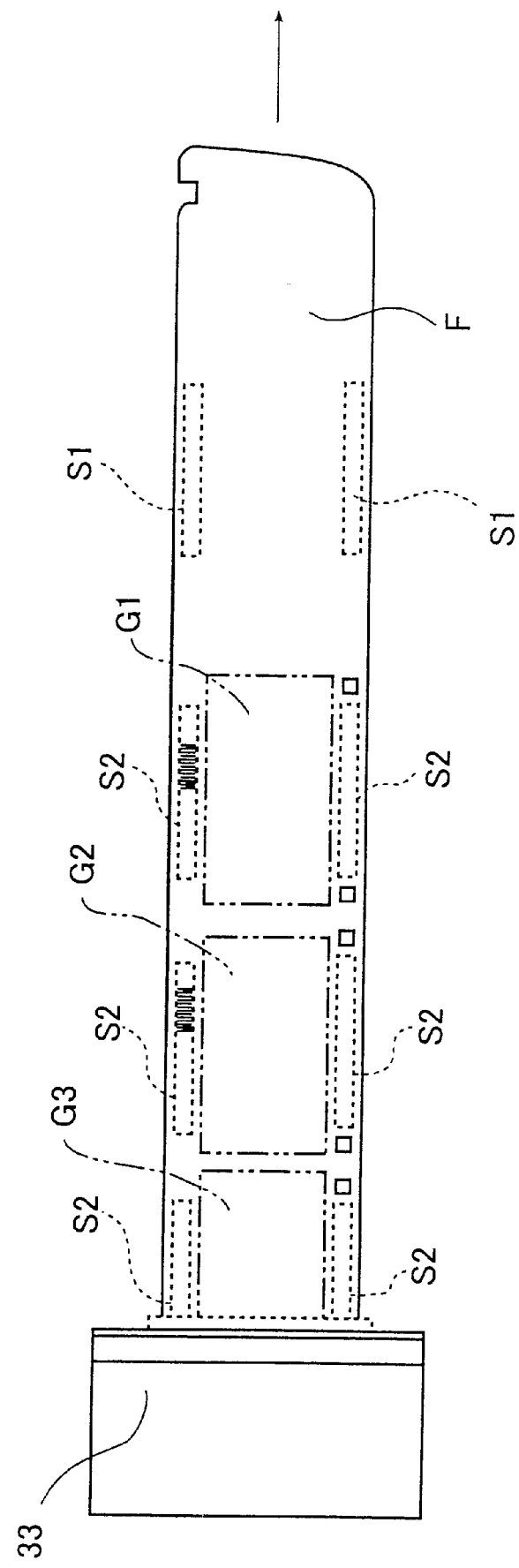
FIG. 3 is a plan view showing an example of a film to be set in the scanner shown in FIG. 2A.

In the case of the Advanced Photo System (APS), as shown in FIG. 3, a magnetic recording layer is provided in a region S2 in each of upper and lower areas of each frame, namely G1, G2 or the like on the back surface (where there is no emulsion layer)of the film F of APS and shooting information of the image of each frame is magnetically recorded in each magnetic recording layer with the shooting camera. For this reason, at the time of the prescan, the magnetically recorded shooting information of the image of each frame, for example, the film-with-lens recognizing code, the lens type recognizing code, information that the film was rewound in the middle of a roll (mid-roll) or the like can be read by the magnetic reading device 31 as shown in FIG. 2A and the thus read information is sent to the image processing apparatus 14.

In the case of a film cartridge with an IC memory, various information such as the film-with-lens recognizing code, the lens type recognizing code, information that the film was rewound in the mid-roll, the condition and time of image shooting, type of camera used for shooting or the like are electrically recorded in this IC memory and these information may be read afterward.

At the time of the fine scan, in the same way as at the prescan, a reading light emitted from the light source 22, adjusted in terms of light amount by the variable diaphragm 24 and made uniform through the diffusion box 26 is incident on the film F which is transported as is being held in registry with a predetermined reading position by the carrier 30 and passes therethrough to obtain a projection light carrying the image recorded on the film F.

The projection light passing through the film F is focused on a light-receiving plane of the CCD sensor 34 by the imaging lens unit 32, photoelectrically read by the CCD sensor 34. An output signal from the CCD sensor 34 is amplified by Amp 36 and sent to the image processing apparatus 14 as image data. A series of the above operations are different from those of the prescan and are performed for every photographed frame based on center position information of each image frame obtained at the time of the prescan which will be described below.

Figure 4:
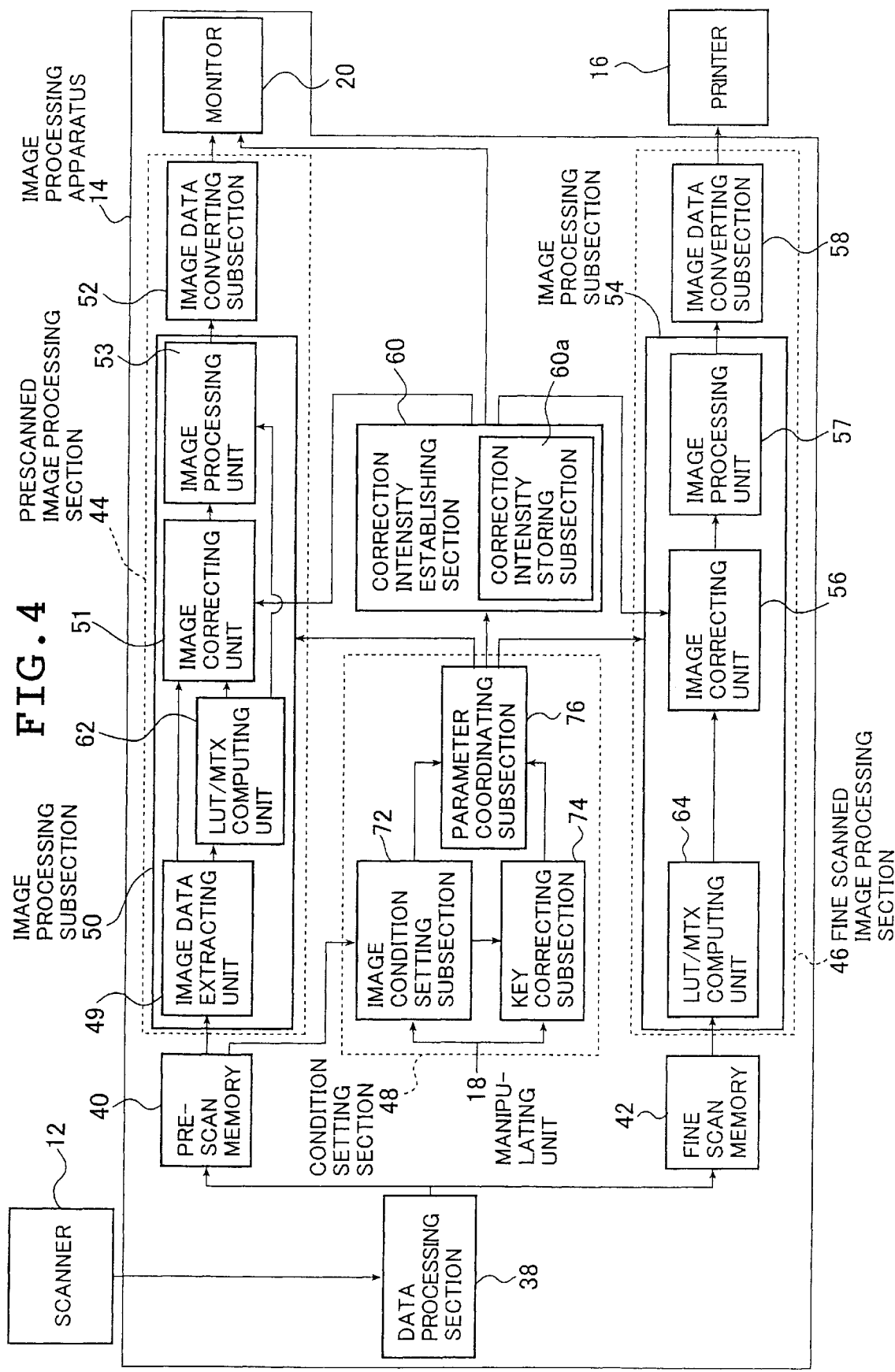
FIG. 4 is a block diagram showing an embodiment of the image processing apparatus shown in FIG. 1.

FIG. 4 is a block diagram showing an embodiment of the image processing apparatus 14.

The processing apparatus 14 which subjects the image data obtained by the scanner 12 to a predetermined image processing for outputting the thus processed image data to a printer comprises a data processing section 38, a prescan memory 40, a fine scan memory 42, a prescanned image processing section 44, a fine scanned image processing section 46, a condition setting section 48, a correction intensity establishing section 60 and a monitor 20.

In the data processing section 38, each of the R, G and B output signals outputted from the scanner 12 is subjected to designated data processing steps such as A/D (analog/digital) conversion, log conversion, DC offset correction, dark correction, shading correction and the like to produce digital image data, of which prescanned (image) data is stored in the prescan memory 40 and fine scanned (image) data is stored in the fine scan memory 42.

The image data processed by the data processing section 38 is stored in either the prescan memory 40 or the fine scan memory 42 and then, if needed, the thus stored image data is read in the prescanned image processing section 44 or the fine scanned image processing section 46 where it is further subjected to image processing to be outputted.

The prescanned image processing section 44 comprises an image processing subsection 50 and an image data converting subsection 52. The image processing subsection 50 comprises an image data extracting unit 49, an LUT/MTX computing unit 62, an image correcting unit 51 and an image processing unit 53.

The image data extracting unit 49 clips an area corresponding to an image frame from the data obtained by reading the film F in a single continuous movement of a roll of film at a constant speed instead of separately reading individual image frames therein by means of the CCD sensor 34, computes the center position of the clipped image to send the thus computed center position of the image to the image correcting unit 51. The image center position is computed because correction formula, which is a correction function used for correction of the image quality deterioration such as correction of chromatic aberration of magnification, correction of distortion aberration, correction of marginal luminosity or correction of defocusing that will be described later, is expressed in terms of a function of the distance from the center position of the image. The computed center position of the image, that is, the center position of the prescanned image data, corresponds to that of the fine scanned image data with a certain precision so that the center position of the image data of the fine scanned image data can be set by utilizing the correspondence therebetween.

When the film-with-lens recognizing code or the taking lens type recognizing code recorded on the film F is photoelectrically read and recognized by the CCD sensor 34 or magnetically read and recognized by the magnetic reading device 31, the image data extracting unit 49 may send the thus recognized information to the correction intensity establishing section 60.

The LUT/MTX computing unit 62 performs image processing such as color balance adjustment, contrast correction and brightness correction.

The image correcting unit 51 performs correction of image quality deterioration (hereinafter referred to simply as "image quality deterioration correction" or "image correction") such as correction of chromatic aberration of magnification, correction of distortion aberration, correction of marginal luminosity, correction of defocusing or the like utilizing the correction formula based on the correction intensity such as correction direction, correction quantity and the like designated by the correction intensity establishing section 60 which will be described later and further performs, if needed, extension/compression of the image by electronic scaling processing.

The image processing unit 53 performs sharpness processing, dodging processing or the like in accordance with the operator's instructions after the image correcting unit 51 performs the image quality deterioration correction, electronic scaling processing or the like. The image data converting subsection 52 converts the image data processed imagewise in the image processing subsection 50 to the image data adaptable to display on the monitor 20 by using 3D-(three dimensional) LUT or the like.

The fine scanned image processing section 46 comprises an image processing subsection 54 and an image data converting subsection 58. The image processing subsection 54 comprises an LUT/MTX computing unit 64, an image correcting unit 56 and an image processing unit 57.

In the LUT/MTX computing unit 64, color balance adjustment, contrast correction (gradation processing) and brightness correction are performed by a known method through LUT (lookup table) processing under the image processing condition set in the prescanned image data based on the fine scanned image whereas saturation correction is performed in the same way as in the above except for MTX computation replacing LUT processing.

The image correcting unit 56 performs the above-described image quality deterioration corrections using the correction formula based on correction intensity (correction method and correction quantity) established in the prescanned image data and further performs the electronic scaling processing in accordance with the operator's command. The image processing unit 57 performs dodging processing or the like in accordance with the operator's command.

The image data converting subsection 58 converts the image data processed imagewise in the image processing subsection 54 to an output image data to be outputted as a print in the printer 16 using 3D (three dimensional)-LUT or the like.

The condition setting section 48 is used for reading the prescanned image data from the prescan memory 40 and then establishing an image processing condition.

Specifically, the condition setting subsection 72 constructs a density histogram, computes an image characteristic quantities or the like, such as average density, an LATD (large area transmission density), high light (lowest density), shadow (highest density) or the like from the prescanned image data and further sets an image processing condition such as construction of a table (LUT) for use in gray balance adjustment or the like or of MTX computation for use in saturation adjustment in accordance with the operator's instructions to be executed on a needed basis. The thus set image processing condition is further adjusted in terms of a condition and renewed in a key correcting subsection 74. In the condition setting subsection 72, correction intensity (correction direction and correction quantity) of the image quality deterioration correction which has been established by the correction intensity establishing section 60 that will be described later is set and, moreover, an output condition for outputting a print or the like for outputting a print such as a print size, an output pixel number, an electronic scaling ratio or the like designated by the keyboard 18a or the mouse 18b is also set. The parameter coordinating subsection 76 coordinates these conditions, correction intensity and the like.

The correction intensity establishing section 60 is a site which demands the operator to judge from the reproduced image of the image recorded on the film F displayed on the monitor 20 whether it is necessary or not for at least one of the image quality deterioration corrections of chromatic aberration of magnification, distortion aberration, deterioration of marginal luminosity and defocusing derived from the taking lens to be performed and which, if the operator judges that it is necessary for the image quality deterioration correction to be performed, then sets and establishes the correction intensity such as correction direction, correction quantity or the like. The correction intensity establishing section 60 also comprises a correction intensity storing subsection 60a which stores the correction intensity established on the image.

A reason why image correction such as correction of chromatic aberration of magnification, correction of distortion aberration, correction of deterioration of marginal luminosity, correction of defocusing or the like can be appropriately performed only by changing correction intensity, namely, correction direction and/or correction quantity is that the image quality deterioration characteristic derived from the taking lens has a feature and tendency of being constant without being influenced by the type of the taking lens and differs only in aberration intensity or aberration direction. Therefore, the correction of image quality deterioration derived from the taking lens can appropriately be performed imagewise only by changing correction intensity (correction direction or correction quantity) of a correction formula as a basis regardless of the type of the taking lens for the image to be appropriately corrected.

The correction formula referred to is of a correction formula in which, if position information of the image, namely, a position coordinate is expressed by means of (x, y) taking the first and second directions as x and y directions respectively, the correction data quantity to be added to the image data is expressed by an expression comprising x and y, for example, a high-rank polynomial comprising x and y, or the correction data quantity of each of x and y directions is expressed by another expression comprising x and y, for example, a high-rank polynomial.

Therefore, in the correction of image quality deterioration in the present embodiment, the correction data quantity decided based on the correction formula as a basis, correction coefficients (a set of correction coefficients) which a re used in the formula and set in accordance with the correction intensity of the image correction and the position coordinate (x, y) which is the position information of the image is added to the image data yet to be corrected. In the present embodiment, the correction coefficients (in a set) of the correction formula have been set in accordance with the correction intensity to be set on the image as a subject of the image correction; however, the correction may be performed either using correction formulae to be individually set in accordance with correction intensity, or with reference to a table or the like to be set in accordance with correction intensity.

In the image quality deterioration, the direction of the image quality deterioration, for example, in the case of distortion aberration, differs between a barrel type and a pincushion type and also its intensity differs between them so that examples of correction intensity to be used for correcting the image quality deterioration include the correction direction and the correction quantity. Accordingly, the correction intensity may be dealt with as two different variables of correction direction and correction quantity; however, since there are generally two directions in the correction direction, the correction direction may be expressed in either + (plus) or − (minus) sign as well as the correction quantity may be expressed in a numerical value. Therefore, the correction intensity may be expressed by a variable with a sign.

As described later, when the correction intensity establishing section 60 makes the image correcting unit 51 to perform the correction of the image quality deterioration on a plurality of images recorded on the film F, images recorded on the film F can be classified into groups, each comprising a plurality of images taken with the same lens automatically or by the operator's command. At this time, the correction intensity establishing section 60 can establish the correction intensity for each group of images allowing the thus established correction intensity for each group to be stored in the correction intensity storing subsection 60a.

In the present embodiment, the correction intensity is designated based on the reproduced image represented on the monitor 20 by the operator; the thus designated correction intensity is set in the correction intensity establishing section 60 to be sent to the image correcting unit 51; the correction of image quality deterioration is performed based on the correction intensity designated by the operator in the image correcting unit 51; the thus corrected reproduced image is displayed on the monitor 20; and the corrected reproduced image displayed on the monitor 20 is judged by the operator as to whether it is appropriate or not. At this time, the correction intensity establishing section 60 performs a sequential process of the image quality deterioration correction including a designating step of correction intensity, an image correcting step and a displaying step of the corrected reproduced image on the monitor 20 at least once until the corrected reproduced image displayed on the monitor 20 is judged as appropriate by the operator. The correction intensity establishing section 60, if needed, repeats the series of all steps of this correction process of image quality deterioration and, when the corrected reproduced image (correction level) is judged as appropriate, the correction intensity used in this correction operation of image quality deterioration is established as the correction intensity for being performed on the image data to obtain an output image data.

In other words, if the correction of image quality deterioration is judged as necessary to be performed on the input image data obtained by the prescan is judged as necessary, the reproduced image recorded on the film F is first displayed on the monitor 20 without being subjected to image correction based on the input image data. Then, the image correction is performed in the image correcting unit 51 on the basis of correction intensity of the correction of image quality deterioration which has been designated by the operator based on the thus displayed reproduced image, namely, correction intensity of each of the correction of chromatic aberration of magnification, the correction of distortion aberration, the correction of marginal luminosity and defocusing correction to display the thus corrected image on the monitor 20. The operator commands the image correcting unit 51 to perform the image correction as looking at the corrected reproduced image displayed on the monitor 20 at least once (repeat more than once if needed) until the operator judges the corrected reproduced image displayed on the monitor 20 as appropriate (hereinafter this image correction operation is referred to as "temporary correction"). Succeedingly, when the operator judges that the corrected reproduced image is appropriate, the correction intensity used for this correction operation is established as the correction intensity for being performed on the image data to obtain the output image data in the correction intensity establishing section 60.

Figure 5:
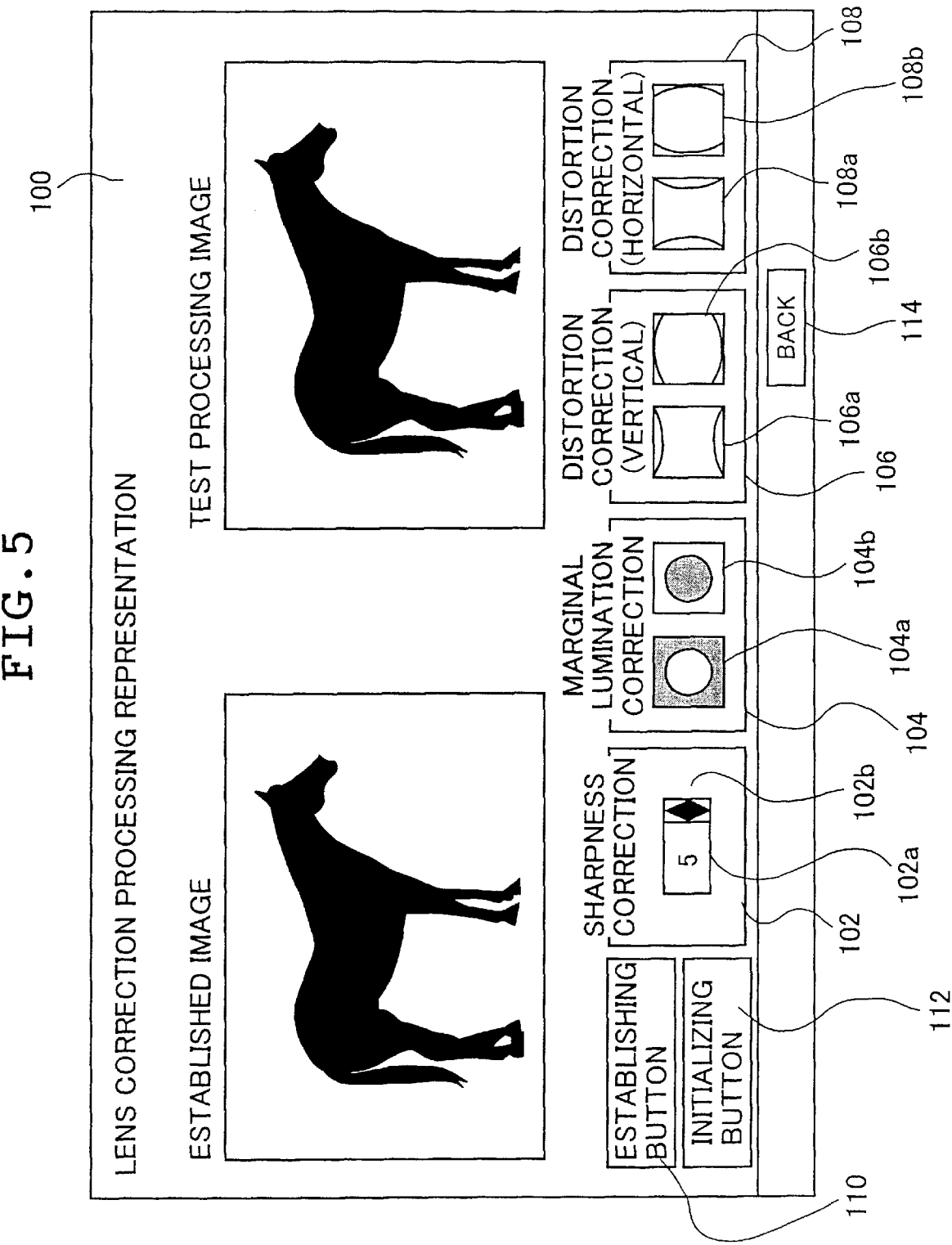
FIG. 5 is a schematic illustration showing an example of a display screen displayed on a monitor according to the image processing apparatus of the present invention.

FIG. 5 shows an example of a lens correction processing screen displayed on the monitor 20 by the correction intensity establishing section 60.

The lens correction processing screen 100 shown in FIG. 5 displays the image yet to be subjected to the temporary correction as an image to be subjected to test processing on the right side thereof and the image after subjected to the temporary correction as an image the correction intensity of which is judged by the operator as good for being established on the left side thereof. In this case, the image yet to be corrected is a reproduced image (yet to be corrected) of the image recorded on the film which the operator judges as necessary to be subjected to the image correction, but it may be the image after subjected to correction with the predetermined correction intensity.

In a lower area of the lens correction processing screen 100 shown in FIG. 5, a sharpness (defocusing) correction column 102, a correction column 104 of marginal luminosity, a correction column 106 of vertical directional distortion and a correction column 108 of horizontal directional distortion are provided.

The sharpness correction column 102 for correcting defocusing comprises a correction level column 102a for setting correction intensity and a temporary correcting button 102b. The correction level column 102a of the lens correction processing screen 100 shown in FIG. 5 indicates that the correction level in the present state is 5. Designation of the correction intensity of sharpness for performing temporary correction of defocusing is executed by either clicking the temporary correcting button 102b located on the right side of the correction level column 102a by means of the mouse 18b or inputting the correction level direct from the keyboard 18a to the correction level column 102a. Each time the temporary correcting button 102b is clicked by the mouse 18b, the correction level moves upward or downward; in accordance with this movement of the correction level, a coefficient used in the correction formula, for example, a coefficient in each term of a polynomial is changed; the correction intensity is set by a correction formula comprising the thus changed coefficient; the temporary correction is performed by the thus set correction intensity; and the image after subjected to the temporary correction is displayed on the monitor 20.

Deterioration of marginal luminosity, as described above, is derived from the lens characteristic that luminosity decreases (becomes dark) from the center area of the image toward its marginal area in accordance with the law of cosine to the fourth power ($\cos^4$). Therefore, the temporary correction to compensate for the loss of luminosity in the marginal area of the image is performed using the correction column 104 of marginal luminosity. The correction column 104 of marginal luminosity comprises a temporary correcting button 104a which darkens the luminosity and another temporary correcting button 104b which brightens the luminosity; hence, the temporary correction is performed by clicking the individual buttons by means of the mouse 18b. The temporary correcting button 104a for darkening the marginal luminosity is used when the marginal luminosity is overly brightened by the temporary correcting button 104b. It is also used in a case in which the luminosity in the marginal area of the recorded image is brighter than that in the central area, depending on the aberration characteristic of the taking lens.

Each time the temporary correcting button 104a or 104b is clicked, the coefficient used in the correction formula, for example, the coefficient used in each term of the high-rank polynomial, changes; the correction intensity is set in accordance with the correction formula comprising the thus changed coefficient; the temporary correction is performed by the thus set correction intensity; and the image after subjected to the temporary correction is displayed on the monitor 20.

The correction of distortion aberration is separated into two types of corrections: corrections of distortion in vertical and horizontal directions. The temporary corrections of distortion aberration in the vertical and horizontal directions of the recorded image are performed by the distortion correction columns 106 and 108 of distortion in the vertical and horizontal directions respectively and independently.

The vertical direction of the recorded image referred to here is of a direction orthogonal to the longitudinal direction of the film F whereas the horizontal direction of the recorded image referred to here is of a direction along the longitudinal direction of the film F.

The distortion correction column 106 in the vertical direction comprises the temporary correcting button 106a of vertical direction which performs the temporary correction of the distorted image when the image in the central area and its vicinity of the recorded image is expanded in the vertical direction and the image in each of the right and left edge areas and their respective vicinities of the image is compressed and the other temporary correcting button 106b of vertical direction which performs the temporary correction of the distorted image when the image in the central area and its vicinity of the recorded image is compressed in the vertical direction and the image in each of the right and left edge areas and their respective vicinities is expanded in the vertical direction and, in accordance with each of the above described two cases, sets the correction intensity of the temporary correction by clicking the temporary correcting button 106a or 106b using the mouse 18b or the like.

Namely, each time the temporary correcting button 106a or 106b is clicked, the coefficient used in the correction formula, for example, the coefficient in each term in the high-rank polynomial, changes; the correction intensity is set by the correction formula comprising the thus changed coefficient; the temporary correction is performed; thereafter, the image subjected to the temporary correction is displayed on the monitor 20.

The distortion correction column 108 in the horizontal direction comprises a temporary correcting button 108a of the vertical direction which performs the temporary correction on the distorted image when the image in the central area and its vicinity of the recorded image is expanded in the horizontal direction and the image in each of the top and bottom edge areas and their respective vicinities of the recorded image is compressed and the other temporary correcting button 108b of the vertical direction which performs the temporary correction of the distorted image when the image in the central area and its vicinity of the recorded image is compressed in the horizontal direction and the image in each of the top and bottom edge areas and their respective vicinities of the recorded image is expanded in the horizontal direction and, in accordance with each of the above described two cases, sets the correction intensity of the temporary correction by clicking the temporary correcting button 108a or 108b using the mouse 18b or the like.

Each time the temporary correcting button 108a or 108b is clicked, the coefficient used in the correction formula, for example, the coefficient in each term in the high-rank polynomial, changes; the correction intensity is set by the correction formula comprising the thus changed coefficient; the temporary correction is performed; thereafter, the image subjected to the temporary correction is displayed on the monitor 20.

A reason why the correction of distortion aberration is performed by the temporary correction of distortion aberration in such way, namely, in each of the vertical and horizontal directions independently is that, in the case of the film with lens or the like, states of aberration in the vertical and horizontal directions are different from each other. Another reason is that, though the aberration characteristic of lens is generally constant in the direction across the plane perpendicular to the optical axis, in the case of the film with lens or the like, lens performance is not so high that the film F is forced to be curved in a recess form seen from the taking lens along the vertical direction, namely, the direction (main scanning direction) orthogonal to the longitudinal direction of the film F thereby decreasing the aberration in the horizontal direction, namely, the longitudinal direction (auxiliary scanning direction) of the film F; in doing such way, the distortion aberration and chromatic aberration of magnification in the vertical direction is made smaller than those in the horizontal direction and, as a result, the correction intensity of distortion aberration and chromatic aberration of magnification of the image in the main scanning direction becomes smaller bringing about a difference of the correction intensity between the vertical and horizontal directions.

The other reason is that, even if the corrections in the vertical and horizontal directions are performed separately, this brings about a correction result which shows a smaller difference between both directions than that brought about when the corrections are performed in both directions simultaneously and, moreover, the necessary capacity of image storing memory is saved by performing correction in one-dimentionally, namely, separately in each direction.

However, the distortion aberration correction may not be performed in the vertical direction and in the horizontal direction separately and, instead, the temporary corrections in both of the above directions may be performed simultaneously.

In the lens correction processing screen 100 shown in FIG. 5, as described above, the temporary corrections of defocusing, deterioration of marginal luminosity and distortion aberration can be performed, but the present invention is not limited to these temporary corrections and may of course involves the temporary correction of chromatic aberration of magnification derived from the characteristic of the taking lens by providing a button designating the correction intensity on a basis of the image of each of the remaining colors of three primary colors when one of them is defined as a reference.

In the present embodiment, the image correction is performed of the correction of distortion aberration separately in each of the horizontal and vertical directions, and may also be performed of corrections of chromatic aberration of magnification and defocusing separately in each of the directions. In the latter case, the corrections in both directions may be performed separately or simultaneously Moreover, the correction intensity is varied step by step every time the upward or downward button or the temporary correcting button in each of the above correction columns is clicked; however, it may be permissible that the correction intensity is inputted direct from the keyboard 18a or the like. The designation of correction intensity of the correction of chromatic aberration of magnification, the correction of distortion aberration, the correction of the marginal luminosity or the defocusing correction may be designated as a whole, as shown in FIG. 5, as being displayed in one screen or may be designated separately as being displayed in individual screens.

If the correction intensity of one correction item, for example, distortion aberration, is established, then the correction intensity of other correction items, namely, the corrections of chromatic aberration of magnification, marginal luminosity and defocusing may automatically be established corresponding to the thus established correction intensity of distortion aberration. In this case, while the correction of distortion aberration is to correct a large deflection, the correction of chromatic aberration of magnification is to correct a small divergence among colors. Moreover, correction quantities and correction precision of the above two corrections are different from each other so that a correction step (correction level difference) of the correction intensity which is changeable step by step by clicking the upward or downward button or the temporary correcting button in the above-described correction column is preferably different between the two corrections.

The lens correction processing screen 100 comprises an establishing button 110 which the operator uses for establishing the correction intensity as looking at the image after subjected to the temporary correction. The operator can establish the correction intensity by clicking the establishing button 110 by means of the mouse 18b or the like. By establishing the correction intensity, the correction intensity of each of the corrections of the distortion aberration, the correction of the marginal luminosity, the defocusing correction and the like is stored in the correction intensity storing subsection 60a and then the correction processing operation moves to an image of the next frame.

The lens correction processing screen 100 comprises an initializing button 112 which returns the image after subjected to the temporary correction back to the test processed image so that the operator can initialize the correction intensity by clicking the initializing button 112 by means of the mouse 18b or the like. If the temporary correction has been performed plural times, a former/previous image subjected to the temporary correction may be brought back by an operator's command.

The lens correction processing screen 100 comprises a cancellation button 114 ("back" button) so that, by hitting the cancellation button 114, the lens correction processing screen 100 can be forcibly closed.

When all images recorded on a film F have been taken with a same taking lens and these images have continuously been subjected to a same image correction, correction intensity storing subsection 60a reads the once established and stored correction intensity of the image from among the images recorded on the film F to be used for the image correction. In doing such way, it becomes no need to extract the correction intensity by performing the temporary correction on each image to be subjected to the same image correction, namely, to obtain, to set and then to establish a most appropriate correction intensity.

The correction intensity stored in the correction intensity storing subsection 60a may be of correction intensity established on an image of any frame in the film F, for example, the correction intensity established on the image in the first frame (leading frame) of the same film or the same film piece, another correction intensity on the image in the mid-roll or the last frame or the other correction intensity established on the image which was previously designated by the operator.

In the present embodiment, the film F is one roll of a web of film wound in the film cartridge but is not limited to the above manner. For example, it may be a film sleeve with a unit number of frames, say 24 or 36 frames, or a film piece cut so as to have 4 to 6 frames therein. The above-described correction intensity may be established for the image on any of these films.

The film or film sleeve in a film cartridge is originally a roll of film so that it is handled as a same case. Even if films are a plurality of film pieces, as far as they are produced by cutting a same film, they can also be handled as a same case. Therefore, in the same case or in the same piece of film, capability of taking pictures with the same camera, namely, the same taking lens, is so high that it is preferable that the correction intensity established on one image is used for remaining images. Even if there are different cases or pieces of film from each other, as far as pictures are taken or are expected to be taken with the same camera, namely, the same taking lens, the correction intensity established on one image from among all images can be used for the remaining images.

In doing such way, the correction intensity established on one image from among all images recorded on the film is stored in the correction intensity storing subsection 60a for each correction item and thereafter the thus stored correction intensity is read to be used for continuously subjecting images to the image correction. However, all images recorded on the film F are not always have been recorded with the same lens and may have been recorded with a different camera by changing the cartridges in the mid-roll. In this case, as described above, the correction intensity establishing section 60 can classifies images of all frames recorded on the film F to groups each comprising images recorded with same taking lens either automatically or by the operator's instructions. At this time, there exist a plurality of correction intensities for each of the correction of chromatic aberration of magnification, the correction of distortion aberration, the correction of marginal luminosity and the correction of defocusing in accordance with the number of the classified groups.

In this case, the correction intensity established by subjecting one image among a plurality of images in each of the thus classified groups to the temporary correction is stored in the correction intensity storing subsection 60a for each group and, thereafter, at the time of performing the correction to a plurality of images in each of the classified groups, the correction intensity stored for each group is read to be used for image correction. Even if an image is in a same group, a new correction intensity to be performed on the image is newly and separately established in accordance with the operator's instructions without reading (and using) the stored correction intensity; then the thus separately established new correction intensity may be performed on the image of interest.

While, in the case of the film F of APS in which pictures are taken with the camera provided with a cartridge mid-roll change (hereinafter referred to simply as "MRC") mechanism which records information which shows a change of film cartridges in the middle of a roll (mid-roll), if the film cartridges are changed in the mid-roll, the MRC information is magnetically recorded in a region S2 in each of upper and lower areas of each frame, namely, G1, G2 or the like on the back surface (where there is no emulsion layer) of the film F, as shown in FIG. 3. By utilizing this MRC information, when the film F is loaded again in the camera, all frames including that not photographed are automatically wound to put the film in a set (ready to be shot) position so that a reloading operation is conducted in a simple, sure and speedy manner. Moreover, by making use of such MRC information, pictures can be taken as they are classified (selected) every subjects to be taken so that chances to enjoy photographic prints from the APS film are enhanced than those in an ordinary film which can not utilize the MRC information.

For example, one film can be used for an assemble of photographed images classified to travels, plays, family members or children. Or otherwise one film can be dedicated to a person's exclusive use. Examples of other applications include flowers for each season, cooking for each filed of interest, scenic spots or individuals for each of certain categories. By changing a plurality of films for each theme of subjects, photographing will become more enjoyable.

In doing such way, all images recorded on the film of APS are not always taken with the same camera, namely, the taking lens having the same aberration characteristic.

In the case of the film F of the APS, at the time of prescan, the scanner 12 can recognize magnetic information, for example, the above-described MRC information, which shows film F is rewound in the middle of a roll (mid-roll) and which is recorded in a region S2 in each of upper and lower areas of each frame, namely, G1, G2 or the like on the back side (where there is no emulsion layer)of the film F of each frame G1, G2 or the like using the magnetic reading device 31 shown in FIG. 2A and then, by utilizing the thus recognized information, all frames on the film F can be classified into a plurality of frames (frame groups) with images which are neighboring with each other in a line and which were are continuously taken with the same camera, namely the same lens. An image in one frame among the plurality of frames in the classified group is subjected to the temporary correction to establish the first correction intensity and then, the thus established first correction intensity is stored in the correction intensity storing subsection 60a for each group. Thereafter, whenever the correction is performed on the above-described plurality of images, the thus established correction intensity is read from the subsection 60a to perform the image correction.

For example, if two MRC information which are additionally recorded in the respective frames of the film are recognized, images recorded on the film F are classified into three groups, namely, a first group comprising a plurality of images from the image in the first frame of the film F to the image in the frame in which a first MRC information is recorded, a second group comprising another plurality of images from the image in the next frame to the frame in which the first MRC information is recorded to the image in the frame in which a second MRC information is recorded and a third group comprising the other plurality of images from the image in the next frame to the frame in which the second MRC information is recorded to the image in the last frame of the film F; the temporary correction is performed on a plurality of images in each of the thus classified groups to obtain correction intensity; and the correction intensity first established by performing the temporary correction on the plurality of images in each classified group is stored for each group by the correction intensity storing subsection 60a.

The correction intensity establishing section 60 clears the correction intensity stored in the correction intensity storing subsection 60a therefrom, after the fine scan has been performed on all images recorded on the film F and all image corrections have been performed using the correction intensity stored in the correction intensity storing subsection 60a.

The correction intensity establishing section 60 preferably stores necessary correction information such as established correction intensity or the like in the memory of the image processing apparatus 14 lest the image correction to be performed on the image to be outputted as a print at the time of printout of the film F in later days should be changed. By doing this, when the reprint output of the film F is performed in later days, the correction information stored in this memory is read out and used for performing the same image correction to output the reprint with the same finishing. In the present invention, both the input image data and the established correction intensity with correspondence therebetween, or output image data itself which has been subjected to the correction of image quality deterioration can be stored in a memory having a large capacity such as a hard disk or the like and, thereafter, at the time of producing the reprint, used to output the reprint with the same finishing subjected to the same image correction as that of the original print. The operator can of course appropriately select either one of the following two cases: the image correction is performed using the thus stored correction information or first the correction intensity is established based on the input image data and then the image correction is performed as described above.

The correction intensity establishing section 60 is constituted as described above.

FIG. 4 primarily shows only sites related to image processing and besides these sites, the image processing apparatus 14 includes a CPU for controlling and managing the overall operation of the photoprinter 10 including the image processing apparatus 14, memories for storing the information necessary for the operation and otherwise of the photoprinter 10 and a device of determining a stop-down value of a variable diaphragm or storage time of a CCD sensor 35 at the time of the fine scan or the like.

The monitor 20 is used for the operator to verify whether the image processing to be performed on the image data is appropriate or not and, particularly in the present invention, to verify and decide whether corrections of various image quality deterioration such as correction of chromatic aberration of magnification, distortion aberration correction, marginal luminosity correction, defocusing correction and the like are appropriate or not; namely, the monitor 20 is used for performing a final verification and is connected to the image processing apparatus 14 via the image data converting subsection 52.

In the present invention, when a reproduced image or a corrected reproduced image after subjected to the correction of image quality deterioration which are based on the input image is displayed, it is preferable that a transparent board with a grid or a straight line formed thereon is placed on the display screen of the monitor 20; the grid or straight line is provided on the reproduced image or corrected reproduced image displayed on the monitor 20; the resultant reproduced image or corrected reproduced image is used as a reference of correction intensity such as correction direction or correction quantity of the image quality deterioration or the like, to decide and designate an appropriate correction direction or correction quantity. The transparent board is preferably a glass plate or an organic board such as an acrylic board or the like. The grid or straight line as a reference may be engraved in the transparent board or written on the surface of the transparent board. The grid or straight line as a reference may be provided on the monitor screen itself or the reproduced image or corrected reproduced image may be displayed on the monitor 20 along with the grid or straight line as a reference. Either or both of the grid and straight line as a reference may be provided.

The image processing apparatus according to the second aspect of the present invention which implements the image processing method of the first aspect of the present invention is basically constituted as described above. Next, its operation and the image processing method of the first aspect of the present invention will now be described with reference to FIG. 6.

Figure 6:
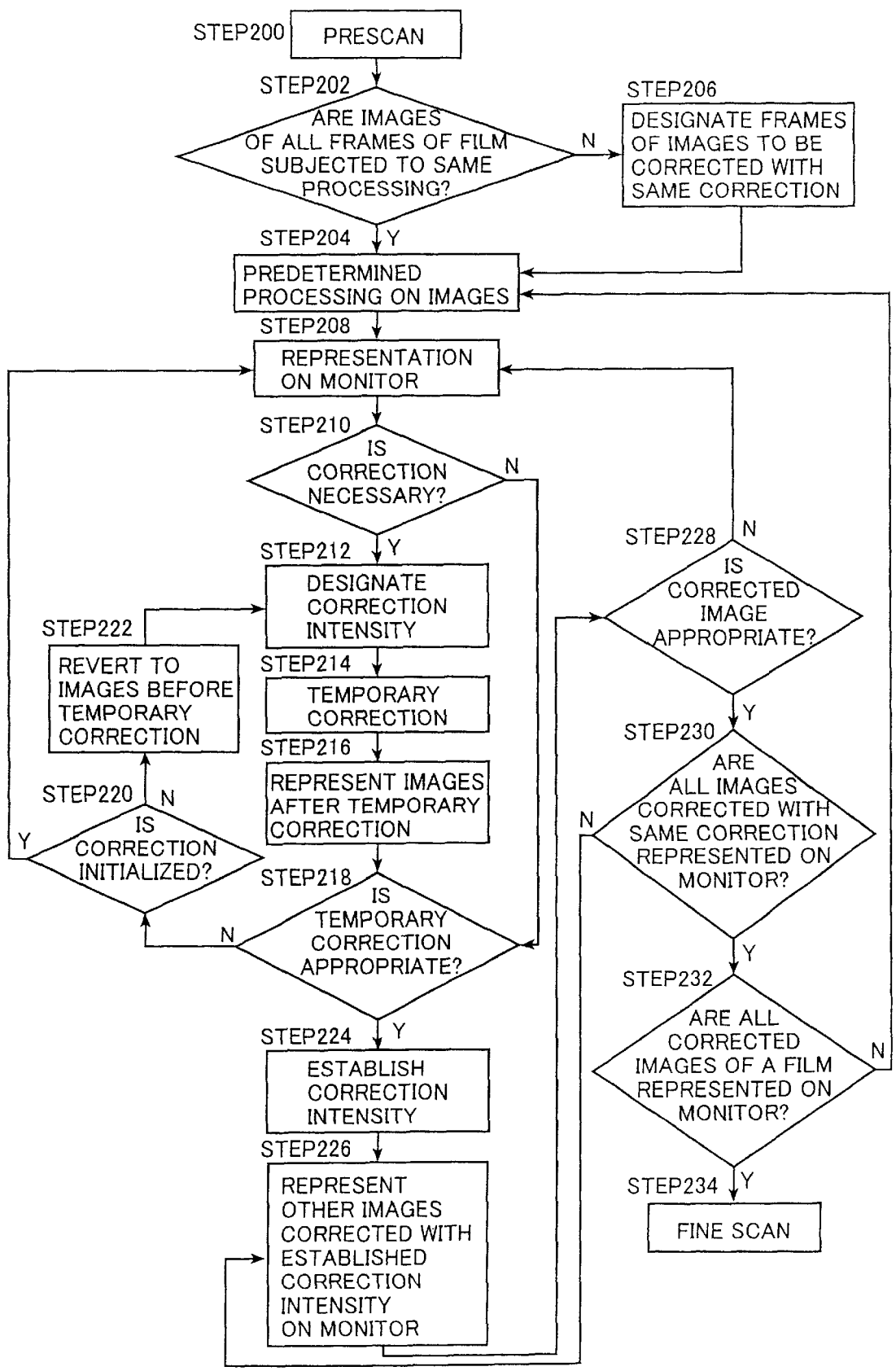
FIG. 6 is a flowchart showing an example of schematic flow of the image processing method of the present invention.

FIG. 6 is a flowchart showing an example of schematic flow from insertion of the film F till the fine scan in accordance with the image processing method of the present invention which is implemented in the digital photoprinter adopting an image processing apparatus of the present invention.

According to the image processing method of the present invention, the operator looks at the reproduced image after subjected to the correction of image quality deterioration displayed on the monitor 20 to establish its correction intensity and then obtains an output image data by correcting the input image data using the thus established correction intensity.

In this case, the image displayed on the monitor 20 can be either of the prescanned image and the main scanned image (fine scanned image). If the prescanned image (data) is used, after the correction intensity is established, the thus established correction intensity is applied to the fine scanned image (data) to allow it to be corrected; and the thus corrected image data is outputted to obtain a printout image.

Now, an explanation will be made below on a case that the correction intensity is established using the prescanned data; the thus established correction intensity is applied to the fine scanned image for outputting a corrected image data; and a printout image can be obtained.

At first the scanner 12 performs the prescan (step 200).

The film F is inserted in the carrier 30. The film F is inserted in one of various dedicated carriers 30 corresponding to a web of film sleeve or film piece of, for example, an APS cartridge, a film with lens or the like. In the scanner 12, reading light is incident on the film F which is being transported in the auxiliary scanning direction perpendicular to the direction in which the line CCD sensors of the CCD sensor 34 extend (the main scanning direction) as it is held in registry with the predetermined reading position by the carrier 30 and passes therethrough to obtain projection light carrying the image recorded on the film F; and the projection light is defined by the slit 28a to have a narrow shape, separated into three primary colors R, G and B and captured photoelectrically by means of the CCD sensor 34. The thus read output signal is amplified by the Amp 36 and sent to the image processing apparatus 14 as the image data which is then subjected to A/D (analog/digital) conversion, log conversion, DC offset correction, dark correction, shading correction and the like in the data processing section 38 and, thereafter, stored in the prescan memory 40.

In the prescan, the image reading operation is not performed for each photographed frame but, instead, the necessary information is read by a single continuous movement of a roll of film F at a constant speed.

Next, a command of operator's judgement result as to whether the same correction of image quality deterioration is performed or not on images of all frames recorded on the film F is inputted (step 202). This input operation is performed by means of the keyboard 18a or the mouse 18b.

Then, if the images of all frames recorded on the film F are subjected to the same image correction, the predetermined processing operation is performed on the image of a first frame recorded on the film F (step 204).

Namely, the prescanned image data stored in the prescan memory 40 is read from an image condition setting subsection 72; construction of density histogram, computation of image characteristic values of average density, LATD (large area transmission density), highlight(minimum density), shadow (maximum density) or the like and so forth are performed; in addition, an image processing condition of construction of a table (LUT) for gray balance or the like or a matrix computation (MTX) for performing saturation correction is set in response to the operator's instructions if necessary. The thus set image processing condition is adjusted in a key correcting subsection 74, combined with all the other conditions in a parameter coordinating subsection 76 and is sent to the image processing subsection 50.

On the other hand, the image data extracting unit 49 reads image data in a roll of film F previously read by the scanner 12 from the prescan memory 40, detects image data corresponding to a frame of the image from the thus read data, sends the thus detected image data to the LUT/MTX computing unit 62, computes position information such as a center position of the image (center position of an optical axis of the recorded image) and sends the resultant information to the image correcting unit 51.

In the LUT/MTX computing unit 62, the image data sent from the image data extracting unit 49 is automatically subjected to color balance adjustment, contrast correction (gradation processing), brightness correction or the like under the predetermined condition. Then the image data is sent to the image correcting unit 51.

In the image correcting unit 51, the thus received image data is subjected to the electronic scaling processing corresponding to the image size suitable for displaying on the monitor 20 without undergoing the image correction such as correction of chromatic aberration of magnification, correction of distortion aberration, correction of deterioration of marginal luminosity, defocusing correction or the like, sent to the image processing unit 53, subjected to sharpness processing if needed, sent to the image data converting subsection 52 and converted to produce the image data for displaying on the monitor.

In a case that images of all frames recorded on the Film F are not subjected to the same image correction, images of a plurality of frames to be corrected with the same correction intensity are designated (step 206). This designation is done by the operator' input or automatically based on information recorded in the film or film cartridge, for example, in the case of the film F of APS, MRC information recorded in an additional fashion in each frame of the film F to be read by the magnetic reading device 31. By this designation, all images recorded in the film F are classified in accordance with images of frames shot with the same taking lens and then are subjected to the above-described predetermined processing (step 204).

In either case, after the image has been subjected to the predetermined processing (step 204) but has not been subjected to the image correction, a reproduced image of the image recorded on the film F is displayed imagewise on the monitor 20 (step 208).

Next, the operator judges whether the image correction is needed or not as looking at the image displayed on the monitor 20 and the thus made judgement result is inputted at a step (step 210).

If the judgement result is inputted such that the image correction is not needed, the correction intensity becomes a default value indicating no performance of the intensity correction; thus, correction intensity is established as such (step 224).

If the judgement result is inputted such that the image correction is needed, a correction processing screen is displayed on the monitor 20 as shown in FIG. 5. In the lens correction processing screen 100, an image before a temporary correction is displayed on the right side of the monitor screen. This image is the reproduced image of the image recorded on the film F, however, it may be the image which will be obtained by performing the image correction on the image recorded on the film F with the predetermined correction intensity.

In a lower area of the correction processing screen 100, a correction designating column 102 for sharpness, a correction column 104 of marginal luminosity, a correction column 106 of vertical direction distortion or a correction column 108 of horizontal direction distortion is displayed. In the lens correction processing screen 100, examples of correction of aberration derived from the lens aberration characteristic include sharpness correction, namely, defocusing correction, marginal luminosity correction or distortion aberration correction, but, in addition, may include correction of chromatic aberration of magnification.

If the operator judges that the correction is needed as looking at the image displayed on the right side of the lens correction processing screen 100, the operator pushes a correction button placed in each of the above-described correction columns to designate the correction intensity (step 212), performs the temporary correction on the image by means of this correction intensity (step 214) and displays the image after subjected to the temporary correction on the left side of the lens correction processing screen 100 on the monitor 20 (step 216).

The temporary correction is performed on the image data based on a correction data quantity which has been obtained from a predetermined correction formula as a basis, for example, a high-rank polynomial, a coefficient of the correction formula changeable in accordance with the correction intensity, for example, a coefficient of the high-rank polynomial and a position coordinate (x, y) of position information of the image wherein x and y represent x direction as a first direction and y direction as a second direction of the recorded image respectively. Then, the image after subjected to the temporary correction is represented on the monitor screen. In the lens correction displayed representation 100, the image to be established is displayed on the left side of the screen.

The above-described correction intensity is designated and the temporary correction is repeated until the operator judges that the image which have been subjected to the temporary correction is appropriate and, accordingly, the temporary correction is appropriate (step 218).

If the temporary correction is judged as appropriate, the image correction is established by the operator and the correction intensity is accordingly established (step 224). Take, for example, the lens correction processing screen 100. The correction intensity is established by pushing the establishing button 110 (step 224).

Though the correction button in each correction column can be pushed repeatedly until the image after the temporary correction is judged as appropriate, a judgement is made in some cases that the temporary correction is not appropriate and the image correction must be initialized (step 220) whereupon initialization of the correction, namely, image before the temporary correction can be displayed on the monitor 20 to initialize the correction intensity to the default value (step 208). Moreover, by the judgement that the correction must be initialized (step 220), the displayed image can go back to the previous corrected image (step 222). In this case, the displayed image goes back to the previous corrected image to designate the correction intensity again from that stage (step 212). In the case of the lens correction processing screen 100, the initialization button 112 can be pushed.

Also in the case of the lens correction processing screen 100, a cancel button 114 can be pushed to terminate the lens correction processing screen 100 forcibly.

Through the above process, the correction intensity of one frame is established. However, in a case that the same correction is performed on all images recorded on the film F on a frame basis or in another case that the same correction is performed on a designated number of plural images recorded on the film F on a frame basis, the correction intensity about one image from among a plurality of images which are to be subjected to the same correction, for example, the image in the first frame or the like of the film F is established and the same image correction is consecutively performed on other images by the thus established correction intensity. Thereafter, the corrected image is displayed on the monitor 20 (step 226).

Next, the reproduced image which has been corrected imagewise with the same correction intensity is judged as to whether it is appropriate or not (step 228). If it is not appropriate, the step goes back to the step 208 to allow the initial image to be displayed on the monitor 20. Thereafter, the temporary correction is performed on the image, the correction intensity is established and the thus established correction intensity is stored whereupon the newly established correction intensity can be obtained. In this case, the operator can input a command that the image correction is performed by applying the newly established correction intensity only to the image of interest even if it has previously been designated to undergo the same correction or that the correction intensity which is valid to only one image in a frame is also valid to images in succeeding frames.

The image correction is performed on a plurality of images which have been designated to undergo the same correction and the thus corrected images are displayed on the monitor 20 each time they are produced. This image correction is performed until the corrected images of all images are displayed on the monitor 20 (step 230).

Next, the corrected images of all images recorded on the film F including a plurality of images in other groups previously designated and classified are displayed on the monitor 20 (step 232).

Then, the fine scan is started with the scanner 12 (step 232).

Contrary to the prescan, the fine scan performs reading with the scanner 12 at high resolution and the resulting image data, namely, the fine scanned image data, is subjected to an image processing condition set by means of the prescanned image to obtain an output image data for outputting a print.

When the prescan is finished, if the film F is a web of film wound in a film cartridge which will not cut the film, the film F is drawn out of a film cartridge 37 up to the last image frame. Taking advantage of this state, the fine scan is performed as the film F is rewound. At that time, the center position of the frame of each image on the film is computed from the center position of the image of the prescanned image data so that the image of each frame is fine scanned utilizing the center position information.

Each of signals R, G and B outputted from the scanner 12 is subjected to A/D (analog/digital) conversion, Log conversion, DC offset correction, dark correction, shading correction or the like to produce digital image data. Its fine scanned image data is stored in the fine scan memory 42.

The fine scanned image data stored in the fine scan memory 42 is sent to an LUT/MTX computing unit 64, is subjected to various image processing by a table (LUT) for a gray balance adjustment or the like, or by a matrix computation (MTX) for saturation correction under the image processing condition set by adjusting the prescanned image by the operator.

In the image correcting unit 56, a correction on the fine scanned image data, namely, at least one of correction of chromatic aberration of magnification, correction of distortion aberration, correction of marginal luminosity and defocusing correction, is performed based on a correction item or the correction intensity established by the prescanned image data and then stored in the correction intensity storing subsection 60a and, thereafter, electronic scaling processing is performed.

After at least one of correction of chromatic aberration of magnification, correction of distortion aberration, correction of marginal luminosity and defocusing correction and, if needed, electronic scaling processing are performed in the image correcting unit 56, the thus processed image data is sent to an image processing unit 57. In the image processing unit 57, dodging processing or the like is performed if necessary and the resultant image data is sent to an image data converting subsection 58.

In the image data converting subsection 58, the received image data is converted imagewise to data suitable for being outputted to a printer and sent to the printer 16 as the output image data.

In the present embodiment, the image processing apparatus 14 is connected to the printer 16 to allow a print to be outputted; however, the image data is not limited to the above but it may be outputted to various recording medium or the like.

The printer 16 comprises a recording apparatus (printing apparatus) for recording a latent image by exposing a light-sensitive material (photographic paper) in accordance with the supplied output image data and a processor (developing apparatus) for performing a predetermined processing on the thus exposed light-sensitive material to output a print.

In the recording apparatus, the light-sensitive material is cut to a predetermined length in accordance with the size of the final print; thereafter, three light beams for exposures to red (R), green (G) and blue (B) in accordance with the spectral sensitivity characteristics of the light-sensitive material are modulated in accordance with the image data outputted from the image processing apparatus 14; then the three modulated light beams are deflected in the main scanning direction while, at the same time, the light-sensitive material is transported in the auxiliary scanning direction perpendicular to the main direction so as to record a latent image by two-dimensional scan exposure with the above-described deflected light beams; and the light-sensitive material carrying the latent image is supplied to the processor. Receiving the light-sensitive material, the processor performs a predetermined wet development process comprising color development, bleach-establishing and rinsing; the thus processed light-sensitive material is dried to produce a finished print; a plurality of thus produced prints are sorted and stacked in a designated unit, say, one roll of film.

When the printer 16 has outputted the prints and finished image processing on these prints in a case, say, one roll of film, correction items or correction intensity set based on the correction items are all cleared.

While the image processing apparatus and the image processing method of the present invention have been described above in detail, the present invention is not limited to the above-described embodiments. For example, according to the above-described embodiments, an output image of high quality is obtained in a sure manner by verifying the corrected image at the time of the prescan before the fine scan is performed; however, it should be noted that the output image of high quality may be obtained in a sure manner by performing the fine scan once without performing the prescan and then verifying that the thus fine scanned image is an appropriately corrected image. In this case, the image data using the temporary correction or the display on the monitor may be a compressed image data which is to be obtained by thinning the fine scanned image data in high resolution.

Moreover, since the correction formula which performs the image correction derived from the taking lens is expressed in terms of function of a distance from the center position of the image data, it is preferred that the center position of the image data and the center position of the taking lens correspond. However, both center positions may almost correspond substantially.

In the correction formula performing the image correction derived from the taking lens, the center position of the image data is taken as a reference. However, the function of the correction formula is not limited to the center position of the image as a reference. The reference may be a corner area (upper-left area) of the image, a certain pixel or the like, as well as an area outside the image, for example, a perforation of the film F or the like, may be taken as the reference.

In the foregoing embodiments, for the purpose of judgement on whether the image quality deterioration correction is appropriate or not, decision, setting, designation or establishment of correction direction and/or correction quantity of the correction intensity, the reproduced image based on the input image data or the corrected reproduced image brought about after the correction of the image quality deterioration has been performed is displayed on the monitor 20; however, the present invention is not limited to the above way, but the reproduced image or the corrected reproduced image may be outputted as a hardcopy in addition to or instead of being displayed on the monitor 20. In this case, the hardcopy image may be outputted for each image or in a sheet of print with a plurality of images therein.

For this purpose, a hardcopy image output device may be connected to the image processing apparatus 14 in place of or in addition to the monitor 20. As the hardcopy image output device 21, a known monochrome printer or color printer may be used; printers utilizing various known printing methods including, for example, an electronic photographic printer, an inkjet printer, a thermal printer and a silver halide type photoprinter are illustrated. Moreover, the printer 16 illustrated in FIG. 1 may also be applicable as the hardcopy image output device 21.

As has been described above in detail, according to the first and second aspects of the present invention, when the image correction is not satisfactorily performed using the obtained lens type recognizing code of the taking lens, or even when the lens type recognizing code of the taking lens can not be obtained, a uniform and appropriate image quality deterioration correction, namely, correction of each or all of distortion aberration, chromatic aberration of magnification, deterioration of marginal luminosity and defocusing can be performed.

Moreover, according to the first and second aspects of the present invention, when the image quality deterioration correction is performed on a plurality of images recorded on the same film, even in the case that the images are recorded with different cameras, namely, images are shot through taking lenses having different aberration characteristics from each other, images taken by the same lens are recognized or designated, the correction intensity about one image among the thus recognized or designated plurality of images is established and then the same image quality deterioration correction can be performed on all of the thus recognized or designated plurality of images using the thus established correction intensity whereupon the image quality deterioration correction can be performed on a plurality of images in an effective, uniform and appropriate manner.

With reference to FIGS. 1 to 3 and FIGS. 7 to 9, the image processing method of the third aspect of the present invention and the image processing apparatus of the fourth aspect of the present invention will now be described.

Figure 7:
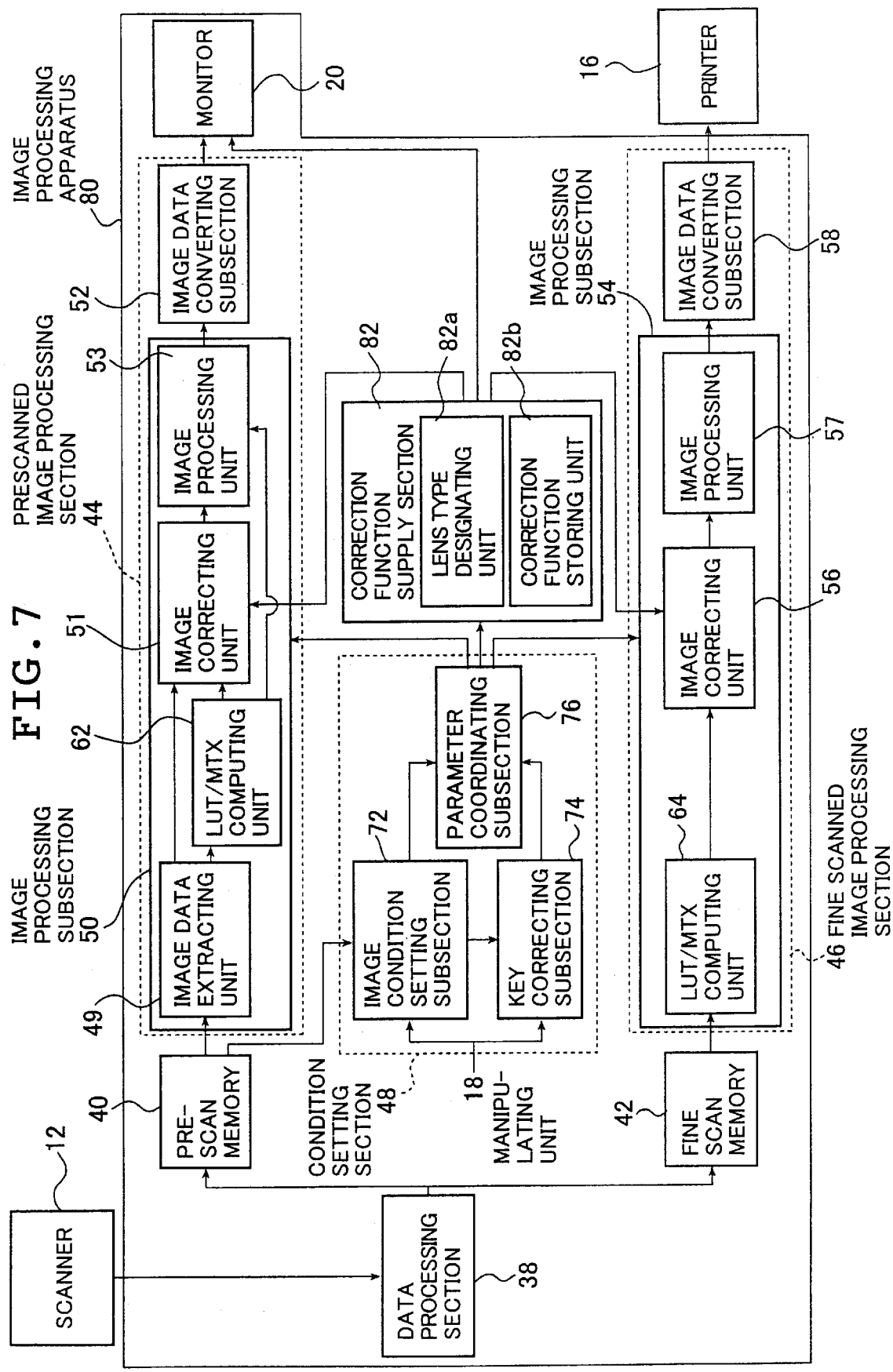
FIG. 7 is a block diagram showing another embodiment of the image processing apparatus shown in FIG. 1.

An image processing apparatus 80 as shown in FIG. 7 is used in place of the image processing apparatus 14 as shown in FIG. 4 in the digital photoprinter as shown in FIGS. 1 to 3. Since the image processing apparatus 80 has the same composition except that correction function supply section 82 is substituted for the correction intensity establishing section 60 and that there are small differences in mechanisms of the image data extracting unit 49, the image correcting devices 51 and 56; hence, the same constituent elements are recognized by the same numerals and will not be described in detail.

In the image processing apparatus 80 according to the fourth aspect of the present invention, the monitor 20, as described above, not only displays a picture for setting or registering various conditions such as the reproduced image based on the input image data for verification or the like of the image and so forth, but also is used for designating the lens type of the taking lens and designating the correction item for correcting various image quality deterioration such as distortion aberration, chromatic aberration of magnification, deterioration of marginal luminosity and defocusing. The manipulating unit 18 comprising the keyboard 18a and the mouse 18b is used not only for inputting or setting the above-described various conditions, but also for selecting or commanding various processing such as designation of the lens type, the correction item or the like.

In the carrier 30 shown in FIG. 2A according to the present embodiment, when the image reading operation is performed by reading the film in a single continuous movement of a roll of film F, for example, in the case of Advanced Photo System (APS), as shown in FIG. 3, the CCD sensor 34 reads the extended DX code printed in the region S1 in a leading end of the film F simultaneously. Particularly, when the film is a film with lens, a film-with-lens recognizing code, namely, "SSU INDICATOR", which shows a film with lens, is recorded as a latent image in the region S1 in the leading end of the film F at the time the film is produced so that judgement as to whether the film F to be subjected to image processing is for APS or not can be executed by reading the DX code developed by developing processing thereby recognizing "SSU INDICATOR". In other words, the prescan which reads the image recorded on the film F by the scanner 12 can recognize the film as the film with lens of APS by reading the image, as well as "SSU INDICATOR".

The prescan reads the magnetic information recorded in a region S2 provided on the back surface of the film F (where there is no emulsion layer) in each of upper and lower areas of each frame, namely G1, G2 or the like by a magnetic reading device 31 and then sends the thus read information to the image processing apparatus 80. In such way, the prescan can obtain and recognize various information such as the film-with-lens recognizing code, an image shooting condition, an image shooting time or the like.

In the case of a film cartridge having an IC memory, various information such as the film-with-lens recognizing code, the image shooting condition and time, type of camera used for shooting or the like are electrically recorded in this IC memory and these information may be used for recognition.

Moreover, the film-with-lens recognizing code is prepared separately from the "SSU INDICATOR" and recorded in the film for the APS magnetically or electrically and the thus recorded recognizing code may be utilized for recognizing the film as being the film with lens. In such way, not only the film of APS but also the 135 size film can be recognized as the film with lens.

"SSU INDICATOR" is an recognizing code which is recorded as a latent image in a 26th bit of an extended DX code of a film of APS and, when developed simultaneously with the development of the film F, shows the film with lens. The recognizing code is always recorded in a film with lens of APS so that any existing image processing apparatus which reads optical information recorded on the film F should perform a reading operation without fail. In print services for APS film, index print is printed. At the time of printing the index print, knowing that the film being the film with lens, frames of images are arranged in reverse order against the shooting order. Moreover, the index print can be utilized for writing a manufacturer's name or a recognition mark.

The image processing apparatus 80, as shown in FIG. 7, which subjects the image data obtained by the scanner 12 to the predetermined image processing comprises a data processing section 38, a prescan memory 40, a fine scan memory 42, a prescanned image processing section 44, a fine scanned image processing section 46, a condition setting section 48 and a correction function supply section 82.

The image data extracting unit 49, as described above, clips an area corresponding to an image frame from the data obtained by reading the film F in a single continuous movement of a roll of film at a constant speed instead of separately reading individual image frames in the film F by means of the CCD sensor 34, recognizes the film-with-lens recognizing code of the extended DX code from the thus read data and, in the case of the APS, recognizes the "SSU INDICATOR" which is recorded in the 26th bit of the extended DX code and shows the film with lens.

When the image data extracting unit 49 recognized the film-with-lens recognizing code or the "SSU INDICATOR" which shows the film of APS, the image data extracting unit 49 sends the information that the device recognized the film-with-lens recognizing code or the "SSU INDICATOR" to the correction function supply section 82.

The image data extracting unit 49 detects and clips the recorded image from data of one roll of film, computes its center position and then sends the computation result to the image correcting unit 51. When a read error of the film-with-lens recognizing code has occurred or the film-with-lens recognizing code has not been recorded, the information that the film-with-lens recognizing code has not been recognized is sent to the correction function supply section 82.

The image correcting unit 51 performs the correction of chromatic aberration of magnification, the correction of distortion aberration, the marginal luminosity correction, the defocusing correction or extension/compression of the image by electronic scaling processing using the correction formula based on the lens aberration characteristic set by the correction function supply section 82 which will be described later in accordance with operator's instructions.

The image correcting unit 56 performs the image processing by the correction of chromatic aberration of magnification, the correction of distortion aberration, the correction of deterioration of marginal luminosity, the defocusing correction and the electronic scaling processing using the correction formula established in the prescanned image data.

The condition setting section 48, as described above, is used for reading the prescanned image data from the prescan memory 40 and then establishing an image processing condition. Also, the condition setting section 48 is used for designating the taking lens type, a correction item from among the image quality deterioration corrections such as the correction of chromatic aberration of magnification, the correction of distortion aberration, the correction of deterioration of marginal luminosity and the defocusing correction.

The correction function supply section 82 comprises a lens type designating unit 82a for designating the taking lens type manually and a correction function storing unit 82b for storing a correction formula and correction coefficients which perform the image quality deterioration correction such as the correction of chromatic aberration of magnification, the correction of distortion aberration, the correction of deterioration of marginal luminosity, the defocusing correction or the like for each lens type designated in the lens type designating unit 82a and is loaded with the correction formula and the correction coefficients for each correction item for correcting the image quality deterioration derived from the taking lens corresponding to the taking lens type designated by the lens type designating unit 82a to acquire the correction function such as the correction coefficients, the correction formula and the like.

The lens type designating unit 82a can designate not only the lens type of the taking lens using the keyboard 18a or the mouse 18b, but also at least one of the correction of chromatic aberration of magnification, the correction of distortion aberration, the correction of deterioration of marginal luminosity and the defocusing correction from a lens correction screen on the monitor manually. In an exemplary illustration of the lens correction screen, as shown in FIG. 8, the lens type is designated from among Type 1, Type 2, Type 3 and the like as well as the correction item is designated from among the correction of chromatic aberration of magnification, the correction of distortion aberration, the correction of deterioration of marginal luminosity, the defocusing correction and all corrections. In the above illustration as shown in FIG. 8, the number of correction items is restricted to five items but the correction item is not limited to the above five items. Moreover, if the correction item has previously been established, it is not necessary to designate the correction item.

The operator will know the lens type of the taking lens with reference to a package, cartridge or the like of the film F. If the film F is an ordinary 135 size film or the like used in shooting with the compact camera, the information on the type of the camera has previously been obtained and put in a memorandum or recorded on the package, patoroone, cartridge or the like and thereafter is referred to when the above judgement is made.

When a signal that the film-with-lens recognizing code was recognized is sent to the correction function supply section 82, the lens type designating unit 82a always displays the lens correction screen on the monitor 20 automatically and demands the operator to designate the lens type. When the reading error of the film-with-lens recognizing code occurs or the film-with-lens recognizing code has not been recorded, a signal that the film-with-lens recognizing code was not recognized is sent to the correction function supply section 82. In that case, the operator is requested to decide whether correction of aberration derived from the lens is performed or not. Only when the operator chose that the correction of aberration derived from the lens should be performed, the lens correction screen is displayed on the monitor in the same way as in the case that the film-with-lens recognizing code was recognized. Because if a camera such as a single-lens reflex camera or the like that needs a cost to some extent is used, high-precision lens elements may be used and a plurality of lens elements may be combined whereupon it in cases does not need to correct aberration derived from the lens in the image processing apparatus 80.

The correction function storing unit 82b of the correction function supply section 82 stores the correction formula and correction coefficients which perform the image quality deterioration correction such as the correction of chromatic aberration of magnification, the correction of distortion aberration, the correction of deterioration of marginal luminosity, the defocusing correction or the like for each lens type designated by the lens type designating unit 82a. The correction formula is not limited to any way but may use the above described correction formula; however, in the present embodiment, the correction formula and correction coefficients are represented by the high-rank polynomial and its coefficient respectively.

The correction formula and correction coefficients are read from the correction function storing unit 82b by designating the lens type or correction items by the operator. However, in order to correspond the thus read correction formula having the thus read correction coefficients to a correction formula having a pixel unit of an output image, the correction coefficients having the pixel unit of the output image which is to be set from an input pixel number of the scanner 12, output size, output pixel number and electronic scaling ratio is computed to obtain a formula having final correction coefficients. Moreover, if the correction of lens aberration is performed, no recorded image is found in the marginal region of a rectangular image, namely, a loss of image may occur; therefore, the rectangular image is enlarged using larger electronic scaling coefficient than the predetermined electronic scaling coefficient but finely adjusted to be of a minimum enlarging coefficient which is capable of containing the image within the desired print size; and, in order to compute the finely adjusting coefficient of the enlarging coefficient, an amount of the image area which does not come out as a print, namely, an amount of the loss of the image, is computed.

The correction formula and its correction coefficients for the correction of the image quality deterioration such as the chromatic aberration of magnification, distortion aberration, deterioration of marginal luminosity, defocusing or the like are stored in the correction function storing unit 82b for each type of the taking lens. The above correction formula and coefficients can be updated in accordance with a correction formula and coefficients of a new lens type using various storing media such as FD (floppy disk), MO (magneto-optic recording medium), Zip or the like. They may also be updated using a computer network such as internet or the like as well as a telephone line.

As for a correction formula having a set of correction coefficients to be stored, in order to correspond the correction formula to a correction formula having a pixel unit of an output image, the correction coefficients having the pixel unit of the print output image which is to be set from an input pixel number of the scanner 12, output print size, output print pixel number and electronic scaling ratio are computed to obtain the formula finally. Correction coefficients in accordance with each of the conditions of input pixel number, output print size, output print pixel number and electronic scaling ratio may previously be established to prepare a table and the thus prepared table may be stored and then a set of correction coefficients suitable for a certain condition may direct be read from among the above stored sets of coefficients.

The image processing apparatus according to the fourth aspect implementing the image processing method according to the third aspect of the present invention is basically constituted as described above. Its operation and the image processing method according to the third aspect of the present invention will now be described with reference to FIG. 9.

FIG. 9 is a flowchart showing an example of a schematic flow from insertion of the film F till the fine scan by an image processing method of an embodiment which is performed in the digital photoprinter adaptable to the image processing apparatus of the present invention.

At first, the film F is inserted to the carrier 30 (step 300). For example, the film F is inserted to each dedicated carrier corresponding to a web of film (sleeve) such as a cartridge of an advanced photo system (APS), a film with lens or the like.

Next, the scanner 12 reads the image and the extended DX code recorded on the film F as the prescan (step 302). In the scanner 12, projection light in a slit form carrying the image recorded on the film F obtained by allowing reading light to be incident on the film F which is being transported in the auxiliary scanning direction as it is registered so as to pass through the predetermined reading position in the carrier 30 is focused on the CCD sensor 34, separated into three primary colors R, G and B and captured photoelectrically by means of the CCD sensor 34. The thus read output signal is amplified by the Amp 36, sent to the image processing apparatus 80 as the image data, subjected to the predetermined conversion processing, correction processing or the like in the data processing section 38 and stored in the prescan memory 40.

In the prescan, the image reading operation is not performed for each of the photographed frames but, instead, the necessary information is read by a single continuous movement of a roll of film at a constant speed.

Next, a judgement as to whether the film-with-lens recognizing code in the thus read extended DX code is recognized or not is made (step 304).

In the case of APS, the extended DX code comprises "SSU INDICATOR" so that whether the read extended DX code comprises the "SSU INDICATOR" or not is examined. If the film-with-lens recognizing code is recognized, lens correction screen which requires designation of the lens type is automatically displayed (step 308). By displaying the lens correction screen automatically, the operator can perform the correction of the aberration derived from the taking lens in a sure way.

In the case that the film-with-lens recognizing code is not recognized, if the operator judges that the lens correction is necessary (step 306), the lens correction screen is displayed by the operator's instructions (step 308).

The lens correction screen, as shown in FIG. 8, can specify the lens type of the taking lens and correction items. The designating operation is performed manually. The lens type to be designated is judged by the operator with reference to the package or the cartridge of the film F. If the film F is an ordinary 135 size film or the like used in shooting with the compact camera, the information on the type of the camera has previously been obtained and put in a memorandum or recorded on the package, patoroone, cartridge or the like and thereafter is referred to when the above judgement is made.

After designating the lens type and the correction item (step 310), the lens correction screen is finished. When designation of the lens type and the correction item is completed at this finishing of the lens correction screen, the correction of the image quality deterioration of the image data is automatically performed (step 316) based not only on color balance adjustment, contrast adjustment (gradation processing), brightness correction or the like (step 314), but also on the designated lens type and the position information of the image.

Namely, the prescanned image data stored in the prescan memory 40 is read through an image condition setting subsection 72 and then the image processing condition is established. The thus established image processing condition is adjusted and set anew in the key correcting subsection 74, as well as all image processing conditions are sent to the image processing subsection 50 after coordinated in the parameter coordinating subsection 76.

On the other hand, the image data extracting unit 49 reads data in a roll of film previously read by the scanner 12 from the prescan memory 40, detects image data corresponding to a frame of the image from the thus read data, sends the thus detected image data to the LUT/MTX computing unit 62, computes the position information such as the center position of the image (center position of an optical axis of the recorded image) and sends the resultant information to the image correcting unit 51.

The correction formula having the correction coefficients is read from the correction function storing unit 82b in accordance with the lens type and the correction item designated by the operator, converted into the correction coefficients of the pixel unit of the image established by the input pixel number of the scanner 12, the monitor display size, the monitor display pixel number and the electronic scaling ratio and then the resultant correction coefficients and correction formula are sent to the image correcting unit 51.

In the LUT/MTX computing unit 62, an automatic correction or the like is performed on the image data sent from the image data extracting unit 49 based on the set image processing condition. The thus processed image data is sent to the image correcting unit 51.

In the image correcting unit 51, the thus received image data is corrected using the correction coefficients and correction formula concerning the center position of the image data and a designated correction item, namely, at least one of the correction of chromatic aberration of magnification, distortion aberration, deterioration of marginal luminosity and defocusing, and the position information from the center position of the image data to be corrected. Thereafter, the electronic scaling processing is performed if needed. Moreover, the image data is subjected to the correction processing in the image correcting unit 51, set up, sent to the image processing unit 53, subjected to sharpness processing, dodging processing or the like if needed, sent to the image data converting subsection 52, converted into the image data adaptable for monitor display and displayed on the monitor 20.

The operator verifies the correction as looking at the corrected image displayed on the monitor 20 (step 318) and consecutively verifies the corrected images by displaying them on the monitor 20 up to the end of one case (say, a roll) of the film F (step 320).

The correction coefficients and correction formula set by the lens type or correction items of the image quality deterioration designated by the operator is used for correction until the image processing of one case of the film F has been performed. However, though not shown in the flowchart in FIG. 9, if the operator judges that the correction has not been appropriately performed as looking at the corrected image, the operator may change the correction coefficient so as to change correction intensity or the correction formula so as to obtain an appropriate corrected reproduced image.

When the display on the monitor as well as verification of the corrected reproduced images of one case of the film F is completed, the correction is established (step 322) and then the fine scan starts (step 330).

If the correction of the aberration derived from the taking lens aberration is not performed (step 306) or the lens type and the correction item are not designated (step 312), the correction of the aberration derived from the taking lens is not performed. In this case, after the color balance adjustment, contrast correction or the like is performed (step 324), the corrected image is displayed on the monitor 20 and verified by the operator (step 326). The operator consecutively displays and verifies the remaining images up to the end of a case of the film F (step 328). When display and verification of the corrected images of a case of the film F are completed, the correction is established (step 322) and then the fine scan starts (step 330).

When the prescan is finished, the film F is in a state that it is drawn out of a film cartridge 37 up to the last image frame. Taking advantage of this state, the fine scan is performed as the film F is rewound. During that time, the center position of the frame of each image on the film is computed from the center position of the image of the prescanned image data so that the image of each frame is fine scanned utilizing the center position information.

Each of signals R, G and B outputted from the scanner 12 is subjected to various conversions and correction processing or the like to be changed into the digital image data which is then stored in the fine scan memory 42 as the main scanned image data (fine scanned image data).

The fine scanned image data stored in the fine scan memory 42 is sent to the LUT/MTX computing unit 64, is subjected to various image processing based on the image processing condition established in the prescanned image and sent to the image correcting unit 56.

In the image correcting unit 56, the correction of chromatic aberration of magnification, distortion aberration correction and, thereafter, electronic scaling processing are performed on the fine scanned image data using the correction formula established by the prescanned image data. In this case, the fine scanned image data is outputted as image data for print output so that the correction coefficients are different from that established by the prescanned image data for display on the monitor 20 and varies in accordance with an output pixel number of the printer, the output condition set at the time of prescanning such as the printer output size, the pixel number of the image data or the like. The correction formula used for this fine scanned image data is computed at the time the operator establishes the correction formula of the prescanned image data.

After at least one of the image quality deterioration corrections such as the correction of chromatic aberration of magnification, the correction of distortion aberration, the correction of deterioration of marginal luminosity, defocusing correction and, if needed, electronic scaling processing is performed in the image correcting unit 56, the thus processed fine scanned image data is sent to an image processing unit 57. In the image processing unit 57, sharpness processing, dodging processing or the like is performed if necessary and the resultant image data is sent to an image data converting subsection 58. In the image data converting subsection 58, the thus supplied image data is converted to a form suitable for being outputted to the printer and thereafter sent to the printer 16 as the output image data.

The printer 16 performs the predetermined processing such as development and other necessary steps for the light-sensitive material (photographic paper) which has been exposed imagewise in accordance with the supplied output image data to output a print.

When the image data is outputted to the printer 16 for print output and image processing on a case, say, one roll of film, is finished, the designated lens type or correction item, or the correction coefficients and correction formula obtained on the basis of the former two are all cleared.

While the image processing apparatus and the image processing method according to the present embodiment have been described above in detail, the present invention is not limited to the above embodiment. For example, in the above-described embodiment, an output image of high quality is always obtained by verifying the corrected image at the time of the prescan before the fine scan is performed. However, it should be noted that the output image of high quality may assuredly be obtained by performing the fine scan only once without performing the prescan and then verifying the thus fine scanned image as an appropriate corrected image. In this case, when the corrected image is displayed for verifying whether the correction is appropriate or not, it is preferable that the image quality deterioration correction and the image display are performed by using a compressed image data obtained by thinning the fine scanned image data in high resolution.

Moreover, the correction formula to correct the aberration (image quality deterioration) is expressed in terms of a function of a distance from the center position of the image data so that the center position of the image is set as a reference. However, the function of the correction formula is not limited to the case that the center of the image is set as the reference but may be applied to other cases that a corner area (upper-left area) of the image, a certain pixel or the like is the reference, as well as a area outside the image, for example, a perforation of the film F or the like is the reference.

As has been described above in detail, according to the image processing method of the third aspect of the present invention and the apparatus of the fourth aspect of the present invention using the image processing method, in a conventional technique which automatically corrects the image quality deterioration by reading the film-with-lens recognizing code comprising the lens type and automatically recognizing the lens type by means of the lens type designating unit which designates the lens type of the taking lens manually, the lens type designated by this lens type designating unit and the position information of the image, since a correcting device which corrects the image data of its aberration (image quality deterioration) derived from the taking lens is provided, when a reading error of the lens type recognizing code of the taking lens occurs, or even when the lens type recognizing code of the taking lens is not recorded, a uniform and appropriate correction of the image quality deterioration such as distortion aberration, chromatic aberration of magnification, deterioration of marginal luminosity, defocusing and the like can be performed without depending on operator's experience or the like.

Moreover, according to the present aspects, when the lens type designating device recognized the film-with-lens recognizing code recorded on the film with lens, the device automatically requests the operator to designate the lens type so that the device will assist the operator in remembering the correction of the aberration derived from the taking lens so as to obtain a print with good finishing in a sure and effective way.

While the image processing method and apparatus of the present invention have been described above in detail illustrating various examples or embodiments, it should be noted that the present invention is by no means limited to the foregoing examples or embodiments and various improvements and modifications may of course by made without departing from the scope and spirit of the invention.

What is claimed is:

1. An image processing method for obtaining image data from an image optically recorded with a taking lens to perform image correction of at least one of corrections of chromatic aberration of magnification, distortion aberration, deterioration of marginal luminosity and defocusing on the image data, comprising the steps of:

recognizing a first signal indicating a film with lens or a second signal indicating to correct aberration;

designating a lens type of said taking lens manually after the recognition of either the first or second signal; and performing said image correction on said image data using the thus designated lens type and a position information of said image.

2. An image processing apparatus for obtaining image data from an image optically recorded with a taking lens to perform image correction of at least one of corrections of chromatic aberration of magnification, distortion aberration, deterioration of marginal luminosity and defocusing on the image data, comprising;

a correction function supply device for recognizing a first signal indicating a film with lens or a second signal indicating to correct aberration;

a lens type designating device for designating a lens type of said taking lens manually after the recognition of either the first or second signal; and a correcting device for performing said image correction on said image data using the lens type designated by said lens type designating device and a position information of said image.

3. The image processing apparatus according to claim 2, wherein, when said image is recorded on the film with lens, said lens type designating device recognizes a recognizing code of the film with lens recorded on the film with lens to demand designation of the lens type automatically.

4. The image processing apparatus according to claim 3, wherein, when said image is an image recorded on a film with lens of an Advanced Photo System, said lens type designating device recognizes SSU INDICATOR as said recognizing code of said film with lens.

* * * * *